(12) United States Patent
Grimald et al.

(10) Patent No.: US 11,436,928 B2
(45) Date of Patent: Sep. 6, 2022

(54) AIRCRAFT MISSION CALCULATION SYSTEM USING AT LEAST AN EXTENDED ISO-DISPLACEMENT CURVE AND RELATED PROCESS

(71) Applicant: DASSAULT AVIATION, Paris (FR)

(72) Inventors: Cyrille Grimald, Saint Cloud (FR); Benoit Urien, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 194 days.

(21) Appl. No.: 16/821,779

(22) Filed: Mar. 17, 2020

(65) Prior Publication Data

US 2020/0302805 A1    Sep. 24, 2020

(30) Foreign Application Priority Data

Mar. 18, 2019    (FR) ...................................... 19 02747

(51) Int. Cl.
*G08G 5/00* (2006.01)
*G06F 16/29* (2019.01)
(Continued)

(52) U.S. Cl.
CPC ........... *G08G 5/0047* (2013.01); *B64D 45/00* (2013.01); *G05D 1/042* (2013.01); *G06F 16/29* (2019.01); *G08G 5/003* (2013.01)

(58) Field of Classification Search
CPC .... G08G 5/0047; G08G 5/003; G08G 5/0021; G08G 5/0034; G08G 5/006;
(Continued)

(56) References Cited

U.S. PATENT DOCUMENTS

| 5,526,000 A | 6/1996 | Chazelle et al. |
| 6,163,744 A | 12/2000 | Onken et al. |

(Continued)

FOREIGN PATENT DOCUMENTS

| EP | 0892962 A1 | 1/1999 |
| FR | 2918471 A1 | 1/2009 |

(Continued)

OTHER PUBLICATIONS

Search Report for priority application FR 1902747.
(Continued)

*Primary Examiner* — James J Lee
*Assistant Examiner* — Shon G Foley
(74) *Attorney, Agent, or Firm* — Davidson, Davidson & Kappel, LLC

(57) ABSTRACT

Aircraft mission calculation system includes a first calculator configured to calculate a plurality of iso-displacement curves from a selected point, at a displacement range corresponding to several successive displacement increments of the aircraft from the selected point, the iso-displacement curves being obtained at the displacement range for a displacement of the aircraft to a given flight level from displacements of the aircraft at distinct flight altitude levels. The first calculator is configured to determine, based on iso-displacement curves up to the given flight level, obtained at distinct flight altitude levels, taken at the same displacement range of the aircraft, an extended iso-displacement curve at the given flight level maximizing the displacement of the aircraft from the geographical point of origin or minimizing the displacement of the aircraft toward the geographical destination point.

20 Claims, 14 Drawing Sheets

(51) Int. Cl.
*B64D 45/00* (2006.01)
*G05D 1/04* (2006.01)

(58) Field of Classification Search
CPC ...... G08G 5/0091; B64D 45/00; G05D 1/042;
G06F 16/29; G06Q 10/047; G01C 21/20
See application file for complete search history.

(56) References Cited

U.S. PATENT DOCUMENTS

| | | |
|---|---|---|
| 6,266,610 B1 | 7/2001 | Schultz et al. |
| 2008/0021635 A1 | 1/2008 | Lohmiller et al. |
| 2013/0046422 A1 | 2/2013 | Cabos |
| 2016/0093222 A1 | 3/2016 | Hale |
| 2016/0210866 A1 | 7/2016 | Pierre et al. |
| 2016/0225265 A1 | 8/2016 | Pierre et al. |
| 2017/0011636 A1 | 1/2017 | Nefflier et al. |
| 2017/0227955 A1 | 8/2017 | Krupansky et al. |
| 2018/0090015 A1 | 3/2018 | Mere |
| 2018/0144643 A1 | 5/2018 | Moravek et al. |
| 2019/0164438 A1 | 5/2019 | Grimald |
| 2020/0020237 A1 | 1/2020 | Grimald et al. |
| 2020/0118448 A1* | 4/2020 | Figlar ............... G01C 23/00 |

FOREIGN PATENT DOCUMENTS

| | | | |
|---|---|---|---|
| FR | 3031806 A1 | 7/2016 | |
| FR | 3032271 A1 | 8/2016 | |
| FR | 3056778 A1 | 3/2018 | |
| WO | WO9729438 | 8/1997 | |
| WO | WO-9917080 A1 * | 4/1999 | ......... G01C 21/3453 |
| WO | WO9917080 A1 | 4/1999 | |

OTHER PUBLICATIONS

Raghuveer Devulapalli: "An Efficient Algorithm for Commercial Aircraft Trajectory Optimization in the Air Traffic System", Jan. 1, 2012, URL:https//conservancy.umn.edu/bitstream/handle/11299/140007/DevulPlli_umn_0130M_12966.pdf;sequence=1.
Zvi Shiller: "Off-Line and On-Line Trajectory Planning In: Mechanisms, Transmissions and Applications", Jan. 1, 2015, vol. 29, pp. 29-62.

* cited by examiner

AIRCRAFT MISSION CALCULATION SYSTEM USING AT LEAST AN EXTENDED ISO-DISPLACEMENT CURVE AND RELATED PROCESS

The present disclosure relates to an aircraft mission calculation system including a calculating engine for calculating aircraft paths during the mission, the calculating engine comprising:

a first path calculating module able to calculate a first optimal mission path between a geographical point of origin and a geographical destination point, as a function of airplane performance, operational mission specifications and a weather context, preferably evolutive, in a mission space between the geographical point of origin and the geographical destination point.

The present disclosure applies to aircraft used in civil aviation, in particular in business aviation.

Such a calculating system is in particular intended to be integrated into a cockpit, in parallel with a flight management system (FMS), to allow the crew to determine mission paths.

In a variant, the computing system is able to be integrated into an offboard mission planning system, for example into an aircraft path establishment airport infrastructure, an electronic flight bag (EFB), and/or in a portable electronic device (for example a tablet), or in a computer of the PC type.

The calculating system is suitable for determining a complete path of the aircraft in the horizontal plane and in the vertical plane on several different flight levels between a first geographical point of origin and a second geographical destination point. The mission comprises one or several steps.

BACKGROUND

The preparation and definition of an aircraft mission between a first geographical point and a second geographical point is a time-consuming task. It in particular requires determining the route that the aircraft will follow, the associated flight profile, and the passenger, freight and fuel load, and calculating the low-speed performance, as well as verifying the flight envelope of the aircraft.

This definition is done based on a mission context including the weather, the airways to be followed, the connectivity with satellite communications systems and an airplane context that includes the configuration and type of aircraft used, as well as its operating state.

Generally, in civil aviation, airlines and/or outside suppliers have computing systems making it possible to provide a flight plan and expected aircraft performance, for example a required quantity of fuel.

In business aviation, the constraints weighing on the crew are considerable and specific. Clients sometimes require the crew to respect stricter mission criteria, for example regarding passenger comfort during the flight, the possibility of connecting to satellite transmission systems, mass offered by the airplane, etc.

Furthermore, the mission conditions, in particular takeoff schedules, are subject to change and the destination may change quickly based on passengers' own needs.

In this context, the existing systems for providing flight plans are not fully satisfactory.

In particular, these systems are designed to operate on a sum of input criteria (speed, flight level, number of passengers, etc.) to which only one navigation solution will correspond. It is therefore frequently necessary to perform several iterations to adjust the mission hypotheses.

The results obtained by flight plan providers' systems are further generally incomplete regarding the criteria required to perform the mission, in particular in managing client criteria, the airplane context and performance.

As a result, the path solutions proposed by the provider are not satisfactory for the client and/or result in a nonoptimal flight time and/or in an increased fuel consumption.

SUMMARY

One aim of the present disclosure is therefore to provide a system for calculating a mission of an aircraft that allows the crew easily to find an optimized path both horizontally and vertically, by taking into account the current state of the aircraft, criteria imposed by the client, and mission volume constraints, in particular in the vertical plane.

To that end, a system of the aforementioned type is provided, characterized in that the first path calculating module is able to calculate a plurality of iso-displacement curves from at least one selected point accessible to the aircraft, at a displacement range corresponding to several successive displacement increments of the aircraft from the selected point, the iso-displacement curves being obtained at the displacement range for a displacement of the aircraft to a given flight level from displacements of the aircraft at distinct flight altitude levels, and to determine, based on iso-displacement curves up to the given flight level, obtained at distinct flight altitude levels, taken at the same displacement range of the aircraft, at least one extended iso-displacement curve at the given flight level maximizing the displacement of the aircraft from the geographical point of origin or minimizing the displacement of the aircraft toward the geographical destination point.

The system according to the invention may comprise one or more of the following features, considered alone or according to any technically possible combination:

an iso-displacement curve up to the given flight level corresponds to an altitude level displacement at the given flight altitude level, at least one iso-displacement curve up to the given flight level corresponding to a displacement of the aircraft at an altitude level distinct from the given flight level, the or each iso-displacement curve up to the given flight level corresponding to a displacement of the aircraft at an altitude level distinct from the given flight level being obtained with a displacement of the aircraft including an altitude level flight phase at the flight level distinct from the given flight level and a phase for reaching the given flight level from the altitude level flight phase;

the phase for reaching the given flight level comprises an ascent or a descent according to a predetermined profile, advantageously with a constant gradient, constant Mach or constant true airspeed;

the calculation of the iso-displacement curve up to the given flight level corresponding to a displacement of the aircraft at a flight altitude level distinct from the given flight level comprises calculating an intermediate displacement increment in which the phase for reaching the flight level begins, determining an intermediate iso-displacement curve at the distinct altitude level at the intermediate displacement increment, then determining the iso-displacement curve up to the given flight level from the intermediate iso-displacement curve;

the extended iso-displacement curve is calculated as the location of the points of the plurality of iso-displacement curves up to the given flight level, for which the displacement of the aircraft from the geographical point of origin is maximized or for which the displacement of the aircraft toward the geographical destination point is minimized, each point of the extended iso-displacement curve being a point of a specific iso-displacement curve up to the given flight level chosen among the plurality of iso-displacement curves obtained for a displacement of the aircraft up to the given flight level from displacements of the aircraft at distinct flight altitude levels;

the chosen point is the geographical point of origin or the endpoint of climb from the geographical point of origin or the chosen point is the geographical destination point for a start point of descent toward the geographical destination point;

the chosen point is a point on a previously determined extended iso-displacement curve;

the first path calculating module is able to determine a plurality of successive iso-displacement curves at each displacement increment, at least one extended iso-displacement curve being obtained from another extended iso-displacement curve by calculating a plurality of iso-displacement curves from the other extended iso-displacement curve, for a displacement range corresponding to several displacement increments of the aircraft, each iso-displacement curve being obtained for a displacement of the aircraft at a distinct flight altitude level toward a given flight level;

the first path calculating module is able to define a path from a plurality of path segments, each path segment being defined at a given flight level on a plurality of iso-displacement curves of the flight altitude level corresponding to the given flight level from an extended iso-displacement curve and/or toward an extended iso-displacement curve;

the first path calculating module is able to determine, after each displacement range corresponding to several displacement increments, a plurality of extended iso-displacement curves at distinct flight levels, at least one path segment being defined between a first point of a first extended iso-displacement curve determined at a first flight level and a second point of a second extended iso-displacement curve determined at a second flight level different from the first flight level, the first point corresponding to a point of an iso-displacement curve resulting from a altitude level flight phase at the second flight level and a phase for reaching the first flight level from the altitude level flight phase at the second flight level;

the first path calculating module is able first to determine a downstream path segment before the geographical destination point or a beginning of descent point toward the geographical destination point and the extended iso-displacement curve corresponding to the last displacement range made up of several iso-displacement increments toward the geographical destination point or toward the geographical beginning of descent point toward the geographical destination point;

the first path calculating module being able advantageously to determine at least one intermediate path segment between at least two extended iso-displacement curves on either side of a displacement range made up of several iso-displacement increments, the first path calculating module next being able to determine at least one upstream path segment between an extended iso-displacement curve corresponding to a displacement range made up of several iso-displacement increments from the geographical point of origin or from an end of climb point from the geographical point of origin;

the mission context includes navigation constraints comprising at least one three-dimensional or four dimensional avoidance zone or three-dimensional or four-dimensional desired passage zone, the extended iso-displacement curve being calculated from chosen iso-displacement curves for displacements at flight altitude levels avoiding the three-dimensional or four-dimensional avoidance zone and/or passing through the three-dimensional or four-dimensional desired passage zone;

each iso-displacement curve is an isochronous curve, the first path calculating module being able to calculate a path minimizing the time between the geographical point of origin and the geographical destination point, or each iso-displacement curve is a fuel iso-consumption curve, the first path calculating module being able to calculate a path minimizing the consumption of fuel between the geographical point of origin and the geographical destination point, or each iso-displacement curve is an iso-cost curve, the cost being defined as a function of the travel time and the consumed fuel, the first path calculating module being able to calculate a path minimizing the cost between the geographical point of origin and the geographical destination point;

the first path calculating module is able to calculate an optimal mission path in a manner not constrained by a network of waypoints and/or paths imposed between the waypoints, the calculating engine including a module for defining, around the optimal mission path, an optimization region of the path and a second path calculating module, able to calculate an optimized path in the optimization region in a manner constrained by a network of waypoints and/or paths imposed between the waypoints, taking the weather context into account, and the or each operational specification includes an airplane context, in particular a type of defective equipment, a dispatch or a failure, and/or includes a mission context, in particular a weather zone to avoid, a prohibited zone and/or a desired passage zone.

A method for calculating a mission of an aircraft is also provided, using a mission calculating system including an engine for calculating paths of the aircraft during the mission, the method including the following steps:

calculating, via a first path calculating module of the calculating engine, an optimal mission path between a geographical point of origin and a geographical destination point as a function of airplane performance, operational mission specifications and a weather context, preferably evolutive, in a mission space between the geographical point of origin and the geographical destination point, characterized in that, during the calculating step, the first path calculating module calculates a plurality of iso-displacement curves from at least one selected point accessible to the aircraft, at a displacement range corresponding to several successive displacement increments of the aircraft from the selected point, the iso-displacement curves being obtained at the displacement range for a displacement of the aircraft to a given flight level from displacements of the aircraft at distinct flight altitude levels, and determines, based on iso-displacement curves up to the given flight level, obtained at distinct flight altitude levels, taken at the same displacement range of the aircraft, at least one extended iso-displacement curve at the given flight level maximizing the displacement of the aircraft from the geographical point of origin or minimizing the displacement of the aircraft toward the geographical destination point.

BRIEF DESCRIPTION OF THE DRAWINGS

The invention will be better understood upon reading the following description, provided solely as an example and done in reference to the appended drawings, in which.

DETAILED DESCRIPTION

Figure 1:
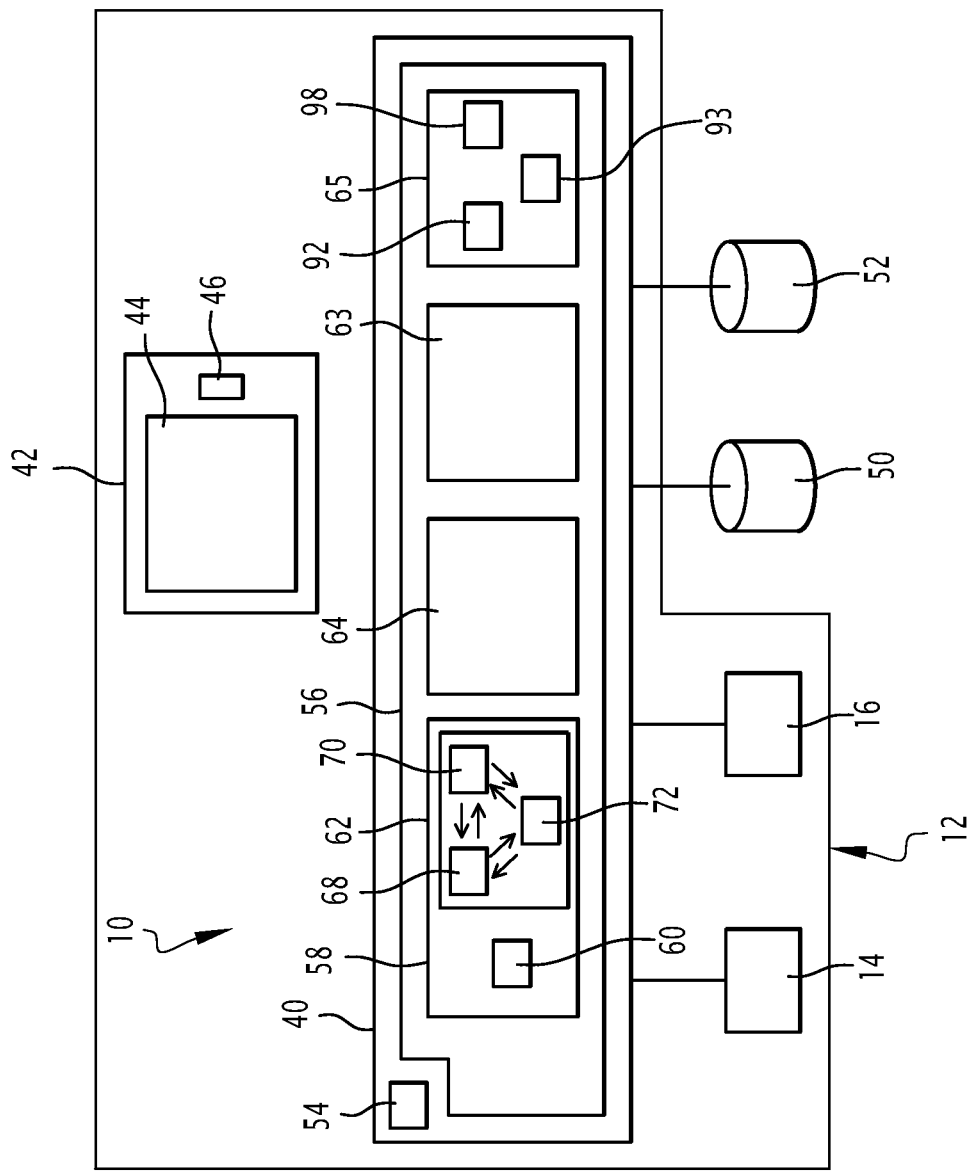
FIG. 1 is a block diagram illustrating a first mission calculating system according to an embodiment of the invention.

A first mission calculating system 10 according to an embodiment of the invention, which, in this example, is present in the cockpit 12 of an aircraft, is illustrated by FIG. 1.

The aircraft is preferably a civilian aircraft, preferably a business plane.

In a known manner, the cockpit 12 of the aircraft is intended to control all of the systems of the aircraft during its use.

The cockpit 12 in particular includes, aside from the mission calculating system 10, a flight management system (FMS) 14 and a system 16 for managing and monitoring the various airplane systems.

The flight management system 14 is intended to aid the pilot of the aircraft in navigating the aircraft during a mission. It is able to provide information in particular on the route followed by the aircraft, and the evolution parameters of the aircraft, such as the fuel consumption.

Figure 2:
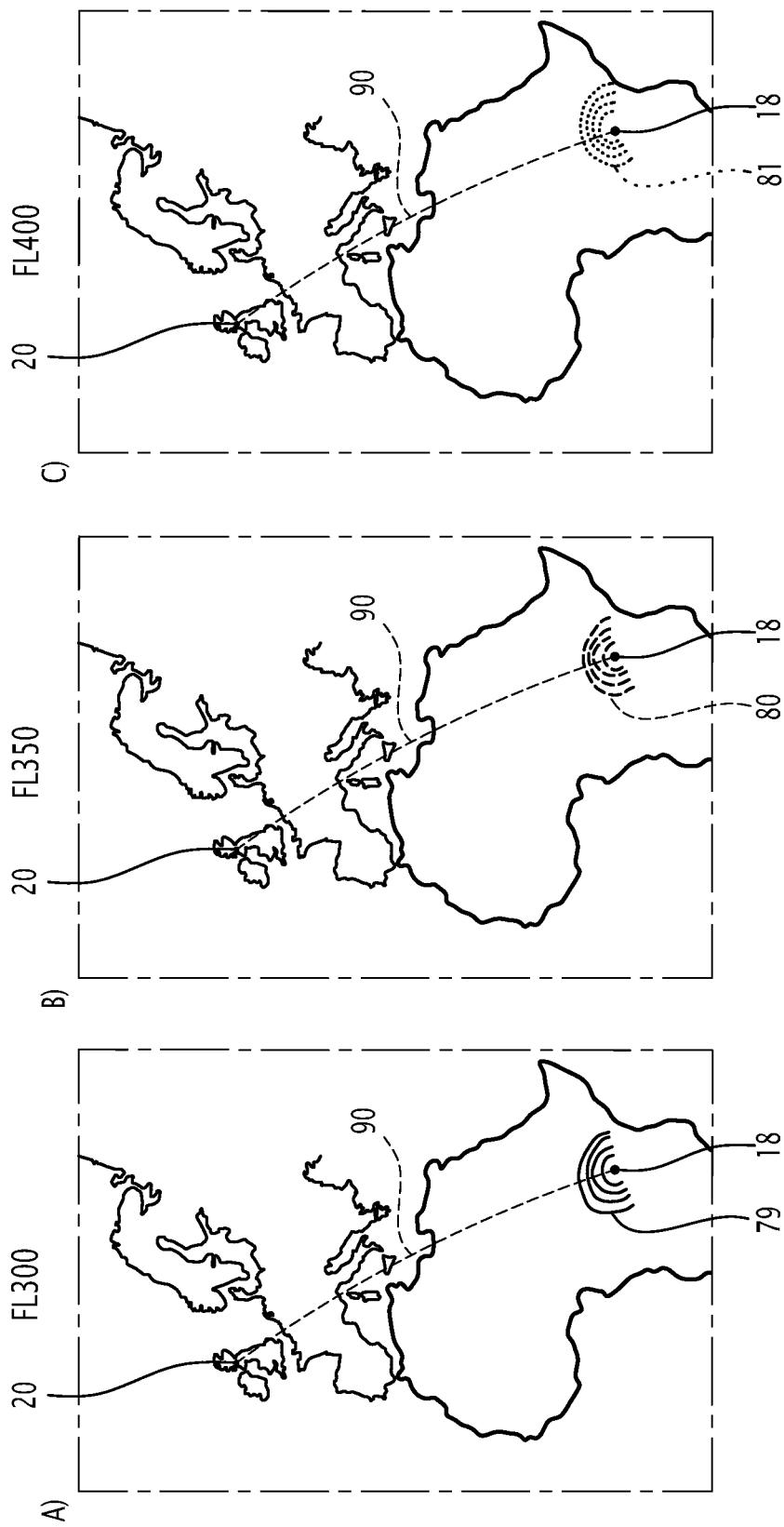
FIG. 2 is a schematic top view illustrating, at several flight levels, the determination of a plurality of isochronous curves after several displacement increments.

It is also able to guide the aircraft to cause it to follow a preset path between a first geographical point of origin 18 and a second destination geographical point 20 (shown schematically in FIG. 2).

The system 16 for managing and monitoring the various airplane systems is in particular intended to allow the crew to monitor and optionally control all of the aircraft systems. It is in particular capable of determining an operating state of the aircraft, in particular in the presence of faults and failures present on the aircraft on the ground and/or in flight. As will be seen below, the mission calculating system 10 is connected to the management system 16 for taking the state of the airplane into account in mission calculations.

Figure 12:
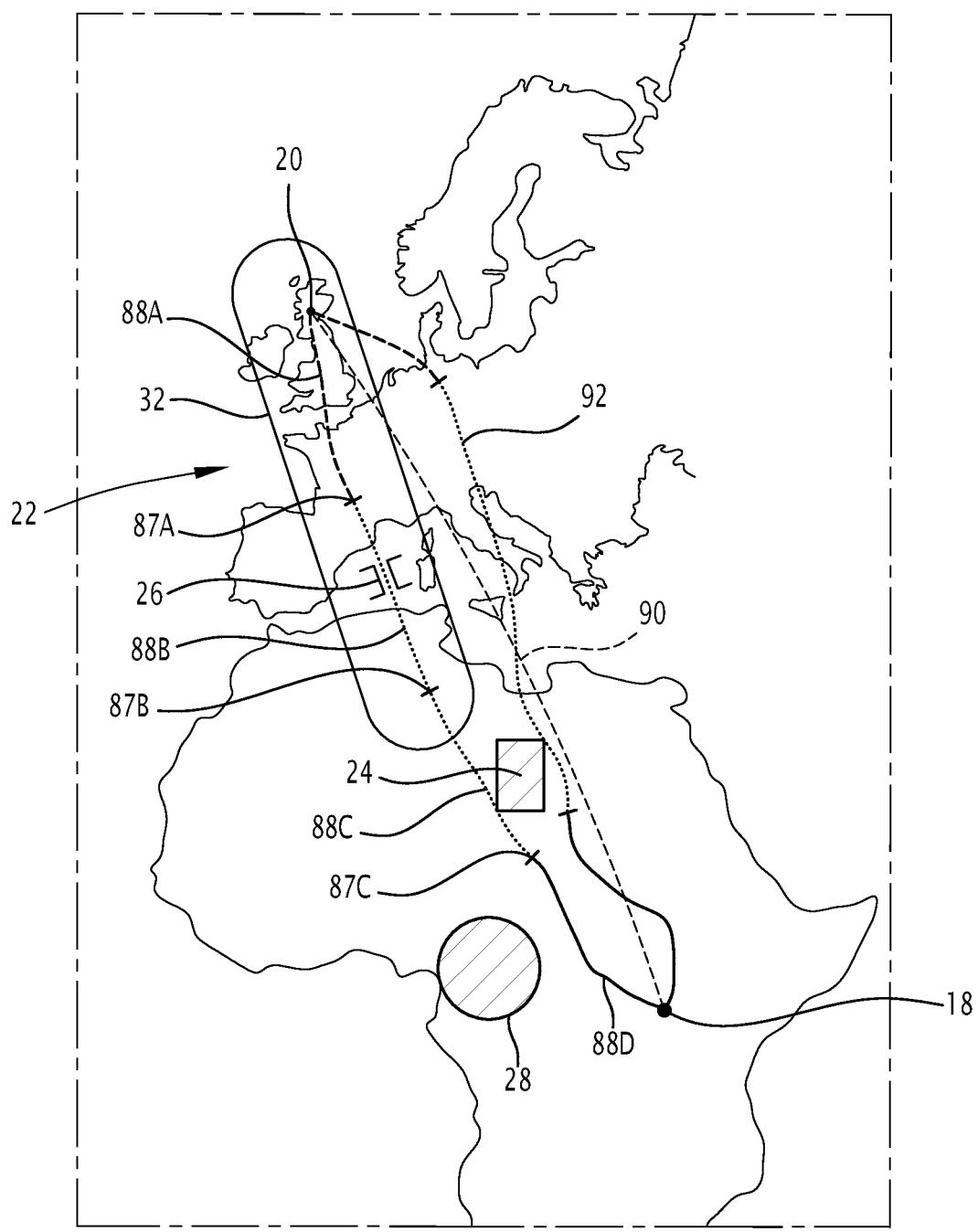
FIG. 12 illustrates the paths obtained using extended isochronous curves, or using extended fuel iso-consumption curves.

The mission carried out by the aircraft comprises at least one step 22 (or leg), shown schematically in FIG. 12, between a first geographical point of origin 18 and a second destination geographical point 20. In some cases (not shown), the mission performed by the aircraft includes a plurality of successive legs 22, the second geographical destination point 20 of a first leg constituting the first geographical point of origin 18 of a second leg.

The mission is performed by following operational specifications that in particular comprise a mission context and an airplane context.

The mission context for example includes at least one operating constraint, in particular a number of passengers to be carried, a maximum weight at takeoff in particular related to an available runway length, a navigation fuel load, a reserve fuel load, an imposed takeoff time and/or arrival time, a maximum distance to be traveled and/or a distance to an alternative terrain en route.

In reference to FIG. 12, the mission context advantageously comprises navigation constraints, for example forbidden zones 24 or flight levels, imposed airways 26 or flight levels, or more generally free flight zones and/or flight zones imposed by the airways.

The mission context advantageously comprises weather constraints such as dangerous weather phenomena zones 28, in particular ice formation or cumulonimbus zones.

The mission context optionally comprises passenger comfort constraints, in particular turbulence zones 30 to be avoided, in particular based on the desired turbulence level, for example chosen from a low, medium and high level of turbulence, or satellite telecommunications coverage zones 32 in order to allow telecommunications between the aircraft and the outside world in particular on the ground, in particular chosen from among a low level, a medium level and a good level of communication possibilities.

In this example, the different zones 24, 28, 30, 32 are preferably defined by horizontal coordinates (for example, latitude and longitude) and by vertical altitude coordinates. The position of these zones advantageously changes over time. In this case, the aforementioned coordinates change temporally, defining a four-dimensional (or 4D) avoidance zone, or on the contrary, a four-dimensional desired passage or constraint zone.

The zones 24, 28, 30, 32 therefore define, in the horizontal plane illustrated in FIG. 12, horizontal avoidance sections, or on the contrary, horizontal desired passage or constraint sections. They also define, in the vertical plane illustrated in FIG. 11, vertical avoidance sections, or on the contrary, vertical desired passage or constraint sections. The position of the zones 24, 28, 30, 32 advantageously changes over time.

The airplane context may comprise usage constraints related to dispatches and/or constraints related to a particular state of the aircraft in terms of faults and/or failures on one or several pieces of equipment of the aircraft.

For example, a dispatch related to certain faults of the aircraft may impose a maximum flight level and/or a maximum speed. A failure to retract the landing gear or a flap may also impose an increased fuel consumption constraint.

The mission calculating system 10 is intended to establish a path of the aircraft to carry out step 22 between at least a first geographical point of origin 18 and at least one second destination geographical point 20, taking account of the operational specifications, and in particular the mission context and the airplane context, while following the existing airways.

The path obtained using the mission computing system 10 includes the route of the aircraft in latitude and longitude, with a vertical flight profile, defined by one or several altitudes and passage times. The route is therefore determined in four dimensions.

Advantageously, the mission calculating system 10 is further capable of establishing flight plan parameters, in particular the weight and balance of the aircraft, the takeoff and landing target (i.e., the flight data for the pilot relative to guiding such as the speeds V1, V2, VR on the runway, the acceleration upon releasing the brakes, the engine speed on takeoff, and/or the attitude on takeoff), the calculation of the limit weights on takeoff and landing, the weather at low speed (i.e., on the surface) and high speed (i.e., en route), the air traffic control information ("Automated Terminal Information Service" ATIS, "Notice to airmen" e-NOTAM, "Flight Information RegionS" FIRS, air traffic control broadcasting services), and/or available alternative terrains at destination, and along the way.

In reference to FIG. 1, the mission calculating system 10 comprises a calculating engine 40 and advantageously a user interface 42 for configuring and retrieval forming a mission deck.

The user interface 42 for example comprises at least one screen 44 and at least one member 46 for the user to select and enter information, which can be a real or virtual keyboard, a mouse and/or a touch-sensitive system.

The user interface 42 is able to allow the user to enter at least some of the operational specifications, in particular the geographical origin and destination points 18, 20, waypoints, desired times, desired loads, a maximum wind on the path, etc.

It is advantageously able to allow the user to define at least a portion of the mission context, in particular the navigation and passenger comfort constraints, and/or to define at least a portion of the airplane context.

An exemplary interface 42 is described in the French patent application titled "Aircraft mission computing system comprising a mission deck and associated method" filed under number 17 01234 by the Applicant.

The calculating engine 40 is connected to the interface 42. It is advantageously also connected to the flight management system 14, the management and monitoring system 16.

It is able to query a weather database 50 and/or a navigation information database 52, for example via a data network, in particular a wireless data network.

The weather database 50 contains current and predictive weather information in the navigation zone of the aircraft in a mission volume extending between the point of origin 18 and the destination point 20. The mission volume preferably has a significant width, for example at least 700 nautical miles, on either side of the orthodromic path 90 between the point of origin 18 and the destination point 20.

This weather data is provided on several flight altitude levels, for example every 304 m (1000 feet), at an altitude for example of between 0 m and 15,545 m (51,000 feet).

The weather data is provided in terms of altitude, but also by providing a weather component evolving over time. This evolutive component is obtained using weather forecasting data, which can include a plurality of weather maps at successive moments over time (for example every hour).

This weather data in particular includes the speed and direction of the wind, temperature, pressure, precipitation, dangerous phenomena (ice, storms/cumulonimbus), turbulence, tropopause level, volcanic ash clouds, dust/sand clouds, visibility, as well as aeronautical observations over the zone or route (METAR, PIERPS) and zone forecasts (TAF), etc. It optionally includes the definition and evolution over time and space of the geographical coordinates of dangerous weather phenomena 28 and/or turbulence zones 30.

This weather data defines a weather context, which is preferably evolutive, in the mission volume extending between the geographical point of origin 18 and the geographical destination point 20.

The navigation information database 52 contains informational data on the terrain at the point of origin 18 and the destination point 20, and between these points 18, 20. The navigation information database 52 advantageously comprises an airport sub-database (runway lengths, runway orientations, flight path angles, etc.) and a navigation sub-database. The navigation data in particular includes a network of waypoints 53A and the imposed paths 53B between the waypoints, as defined by the air traffic authorities in each country (see FIG. 13).

It advantageously contains the definition of the geographical coordinates of prohibited zones and/or flight levels 24, in particular due to geopolitical data, and/or imposed airways 26.

It optionally comprises the definition of satellite telecommunications (SATCOM) coverage zones 32.

The calculating engine 40 comprises at least one computer including at least a processor 54 and a memory 56. The memory 56 contains software modules able to be executed by the processor 54. In a variant, the modules are made at least partially in the form of programmable logic components, or in the form of dedicated integrated circuits.

In this example, the memory 56 contains a software module 58 for initializing mission specifications, capable of acquiring operational specifications of the mission in particular from the interface 42, and including a software module 60 for recovering a weather context from the database 50, and a software module 62 for determining airplane performance levels, as a function of mission specifications, the weather context and the airplane context.

Memory 56 also contains a first software module 64 for calculating a first optimal mission path 64A, based on determined airplane performance, the weather context and mission specifications, the first calculating module 64 being able to calculate the first optimal mission path 64A unrestricted by a network of waypoints 53A and/or imposed paths 53B between the waypoints 53A.

Advantageously, as disclosed in French application no. 1,800,734, the memory 56 also contains a module 63 for defining, around the first optimal mission path 64A, an optimization region 63A of the optimal path 64A and a second module 65 for calculating an optimized path 65A of the aircraft in the optimization region 63A, in a manner restricted by a network of waypoints 53A and/or imposed paths 53B between the waypoints 53A.

The initialization module 58 is capable of acquiring the operational specifications of the mission from the interface 42, and/or from the management and monitoring system 16.

The recovery module 60 is capable of querying the weather database 50 in particular to obtain the speeds and directions of the wind in the mission volume extending between the point of origin 18 and the destination point 20, at several flight levels.

The determining module 62 comprises a software application 66 for determining the weight and balance of the aircraft, intended to determine the center of gravity of the aircraft, a software application 68 for determining high-speed performance, and advantageously a software application 70 for determining low-speed performance.

The application 66 for determining the weight and balance of the aircraft is capable of determining the position of the center of gravity of the aircraft with no fuel in the aircraft (or Zero Fuel Weight Center of Gravity) and the weight of the aircraft with no fuel in the aircraft (or Zero Fuel Weight), based on the empty weight of the aircraft, equipment embedded in the aircraft, passengers and/or freight on board, and in their position in the aircraft, as well as monitoring of the flight envelope of the aircraft (weight—centering diagram).

The application for determining high-speed performance 68 is capable of determining the weight of fuel to be placed on board the aircraft on a given path, for example an orthodromic path 90 (see FIG. 12) between the point of origin 18 and the destination point 20, using the position of the center of gravity and the weight of the aircraft with no fuel in the aircraft (or Zero Fuel Weight) determined by the application 66, a preset airspeed, for example entered or computed from data entered by the user interface 42, the weather context recovered from the module 60, in particular wind speeds and temperatures, and optionally the airplane context, for example the type and age of the engines, recovered from the initialization module 58.

The application for determining high-speed performance 68 further includes functions for instantaneous fuel consumption and instantaneous airplane mass variation during a path, advantageously using the position of the center of gravity and the weight of the aircraft with no fuel in the aircraft, a preset airspeed, for example entered or computed from data entered by the user interface 42, the weather context recovered from the module 60, in particular wind speeds and temperatures, and optionally the airplane context, for example the type and age of the engines, recovered from the initialization module 58.

The high-speed performance determining application 68 also includes a function for determining achievable flight levels as a function of the predetermined airspeed, the weather context, and optionally the airplane context.

These functions for calculating instantaneous consumption, calculating instantaneous airplane mass variation and determining achievable flight levels are able to be called by the calculating module 64 in order to calculate iso-displacement curves.

The application for determining low-speed performance 70 is capable of determining in particular the maximum weight of the aircraft (and the takeoff target) allowing the aircraft to take off and/or land on terrain, based on runway length data recovered from the database 52, and the weather context recovered from the module 60.

First calculating module 64 is configured to calculate, from at least one chosen point 78 accessible to the aircraft, a plurality of iso-displacement curves 79, 80, 81 each corresponding to a displacement of the aircraft at a distinct flight altitude level (for example FL300, FL350, FL400), after one or several displacement increments. The number of altitude levels is equal to 3 in the illustrated example. In practice, the number of altitude levels is greater than or equal to 2 and is for example between 2 and 20, advantageously between 6 and 20.

The first calculating module 64 is able to determine, based on iso-displacement curves 79, 80, 81 obtained at the same displacement range corresponding to several displacement intervals at different flight altitude levels FL300, FL350, FL400, at least one extended iso-displacement curve 83, maximizing the movement done from the geographical point of origin 18 or minimizing the movement to be done up to the geographical destination point 20.

The first calculating module 64 is further capable of calculating at least one optimal path 64A between the point of origin 18 and the destination point 20 based on the extended iso-displacement curves 83.

The chosen accessible point 78 is initially the geographical point of origin 18, as illustrated by FIG. 2. In a variant, the chosen accessible point is an end of climb point from the geographical point of origin 18.

Figure 7:
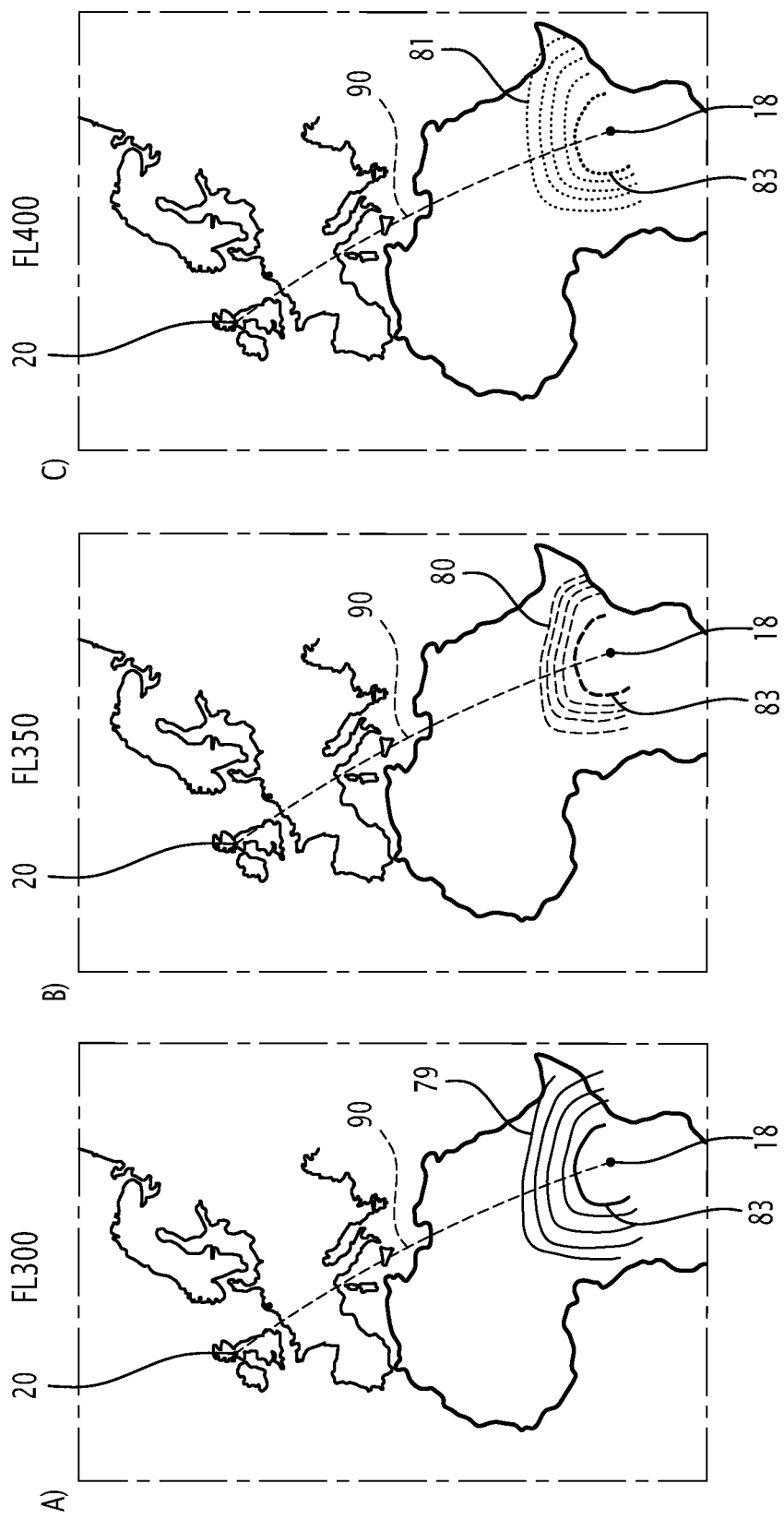
FIG. 7 is a view similar to FIG. 6, illustrating, at several flight levels, the determination of a plurality of isochronous curves from extended isochrones.
Figure 8:
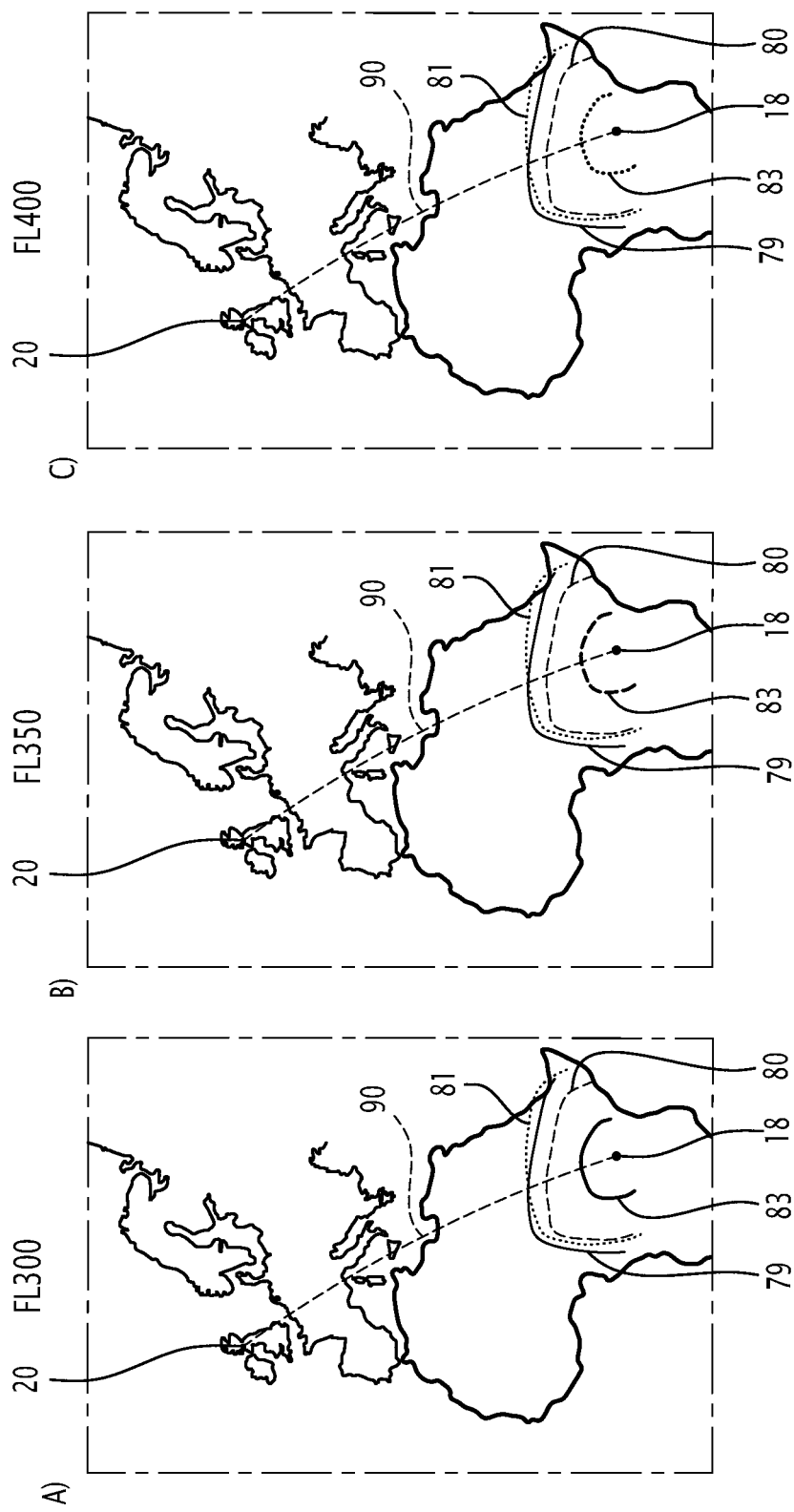
FIG. 8 is a view similar to FIG. 7, illustrating the determination of the extended isochronous curves at each of the flight levels at a second displacement range.
Figure 9:
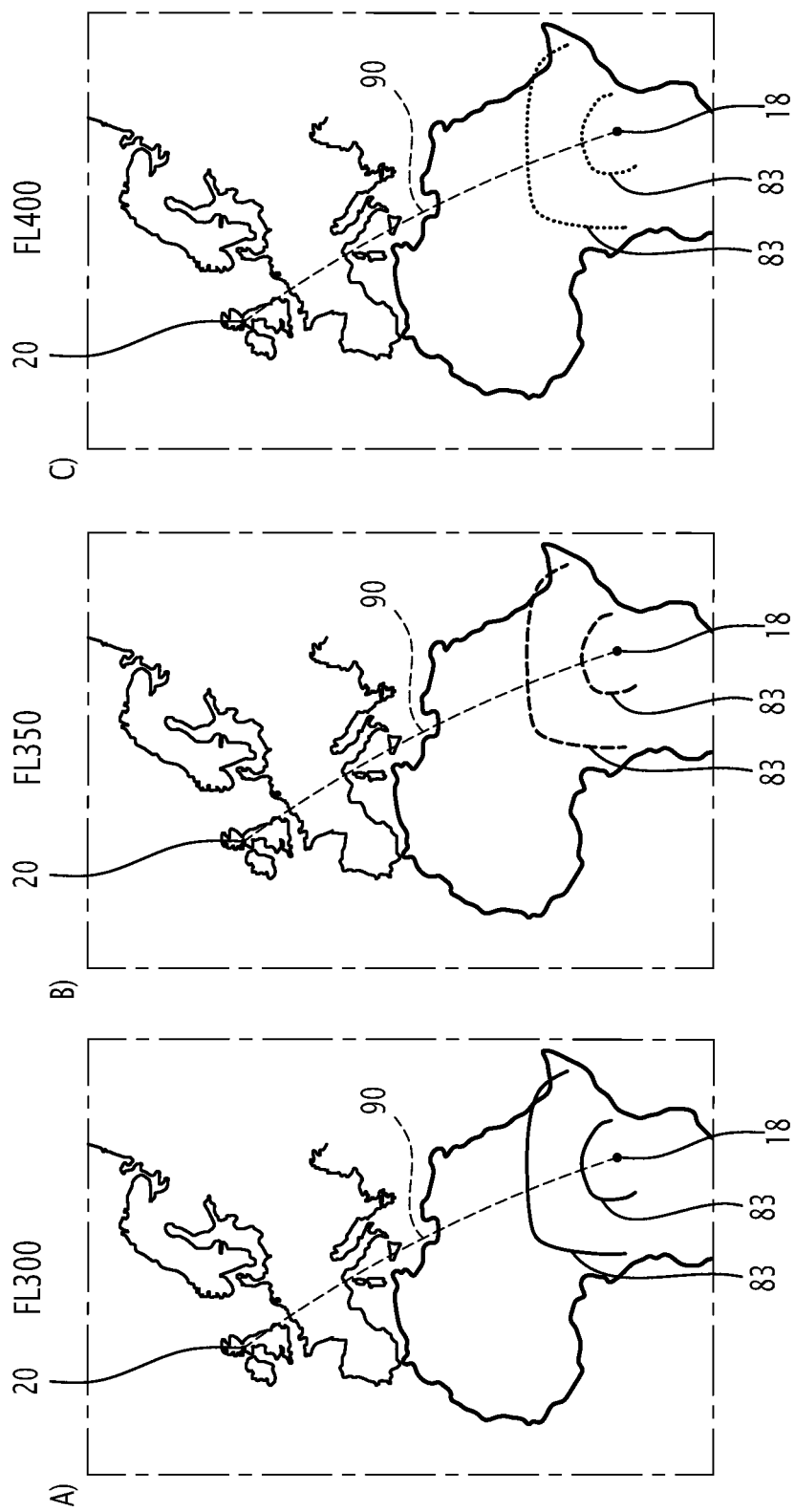
FIG. 9 is a view similar to FIG. 8, the extended isochronous curves having been determined.

Once at least one extended iso-displacement curve 83 is obtained, each iso-displacement curve 79, 80, 81 is obtained from accessible points 78 located on the extended iso-displacement curve 83, as illustrated by FIG. 7.

In the example illustrated by the figures, the first calculating module 64 is able, from the geographical point of origin 18 or any point of an extended iso-displacement curve 83, to establish at least one iso-displacement curve 79, 80, 81 over a preset time increment from the chosen point, taking account of the selected airspeed, the weather context, airplane performance determined by calculating functions of the application 68, and operational specifications defined by the initialization module 58.

Figure 3:
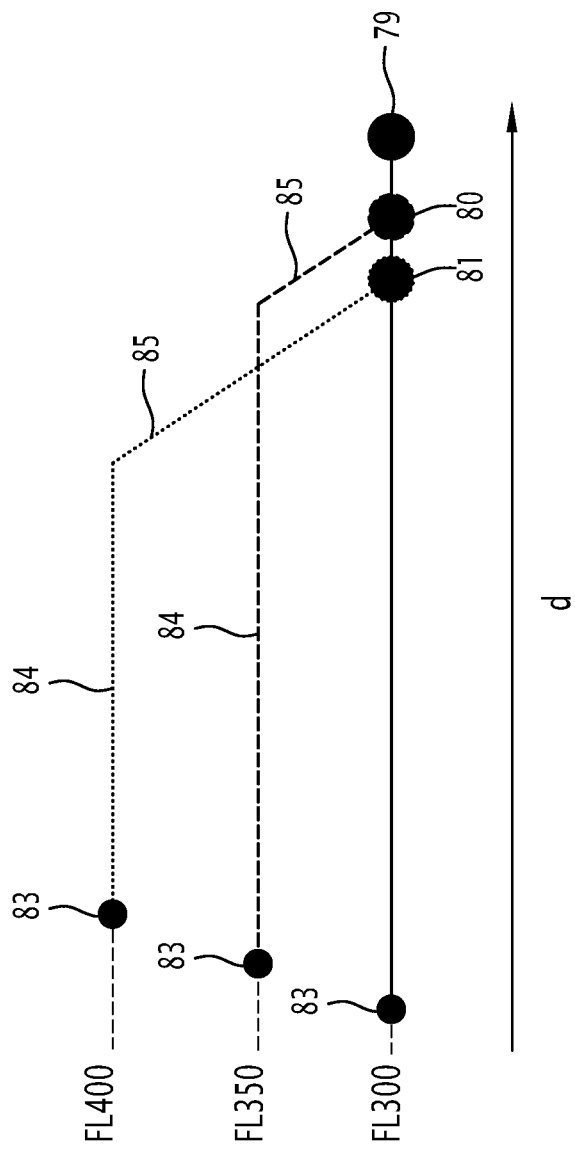
FIG. 3 is a vertical profile view of the displacements of the aircraft at distinct altitude levels, to determine isochronous curves in order to establish a point of an extended isochronous curve at a given flight level.

In reference to FIG. 3, the iso-displacement curves 79, 80, 81 are obtained for a given flight level, here FL300, for displacements of the aircraft at an altitude level, at starting flight levels FL300, FL350, FL400 equal to or distinct from the given flight level FL300 from an accessible point here located on an iso-displacement curve 83 of the respective starting flight level FL300, FL350, FL400.

Thus, the iso-displacement curve 79 is obtained by causing the aircraft to move at a constant altitude level corresponding to the given flight level FL300, from an accessible point on the extended iso-displacement curve 83 at the starting flight level FL300 that corresponds to the given flight level FL300.

The iso-displacement curves 80 and 81 are obtained by performing an altitude level flight phase 84 at a starting flight level FL350, FL400 distinct from the given flight level FL300, starting from the iso-displacement curve 83 at the respective starting flight level FL350, FL400, then a phase 85 for reaching the given flight level FL300.

The reaching phase 85 for example comprises a climb or a descent according to a predetermined profile, for example with a constant gradient, a constant true airspeed or a constant Mach in order to reach the given flight level FL300 from the altitude level flight done at a flight level FL350, FL400 distinct from the given flight level FL300.

Advantageously, for a given displacement range corresponding to several displacement increments, the calculating module 64 is able to determine an intermediate increment from which the reaching phase 85 begins, by for example determining the time necessary to reach the given flight level FL300 from the respective starting flight level FL350, FL400.

This intermediate increment is determined as a function of the predetermined flight profile in the phase 85, taking account of the selected airspeed, the weather context, the airplane performance levels determined by the calculating functions of the applications 66 and 68, and operational specifications defined by the initialization module 58.

The calculating module 64 is next able to determine an intermediate iso-displacement curve, at the intermediate increment, for an altitude level flight at the starting flight level FL350, FL400, then to define the iso-displacement curves 80, 81 at the given flight level FL300 derived from the reaching phase 85, at the displacement range, from the intermediate iso-displacement curve previously defined.

Figure 5:
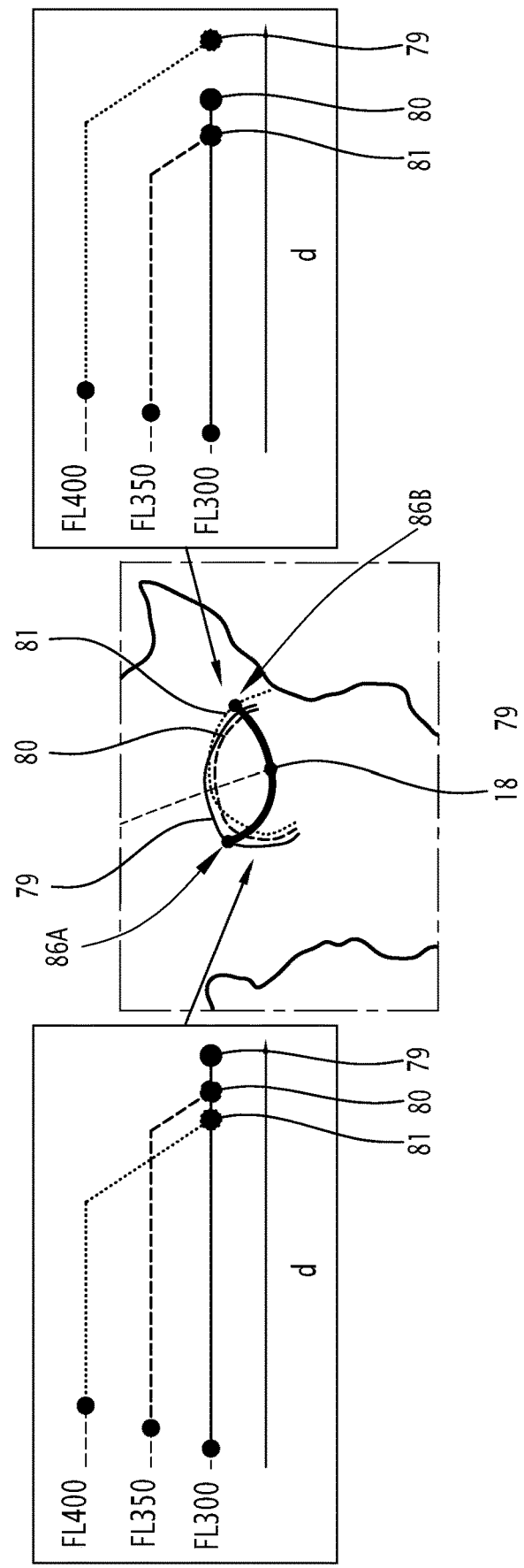
FIG. 5 is a view similar to FIG. 2, for a given flight level, illustrating the obtainment of an extended isochronous curve.
Figure 6:
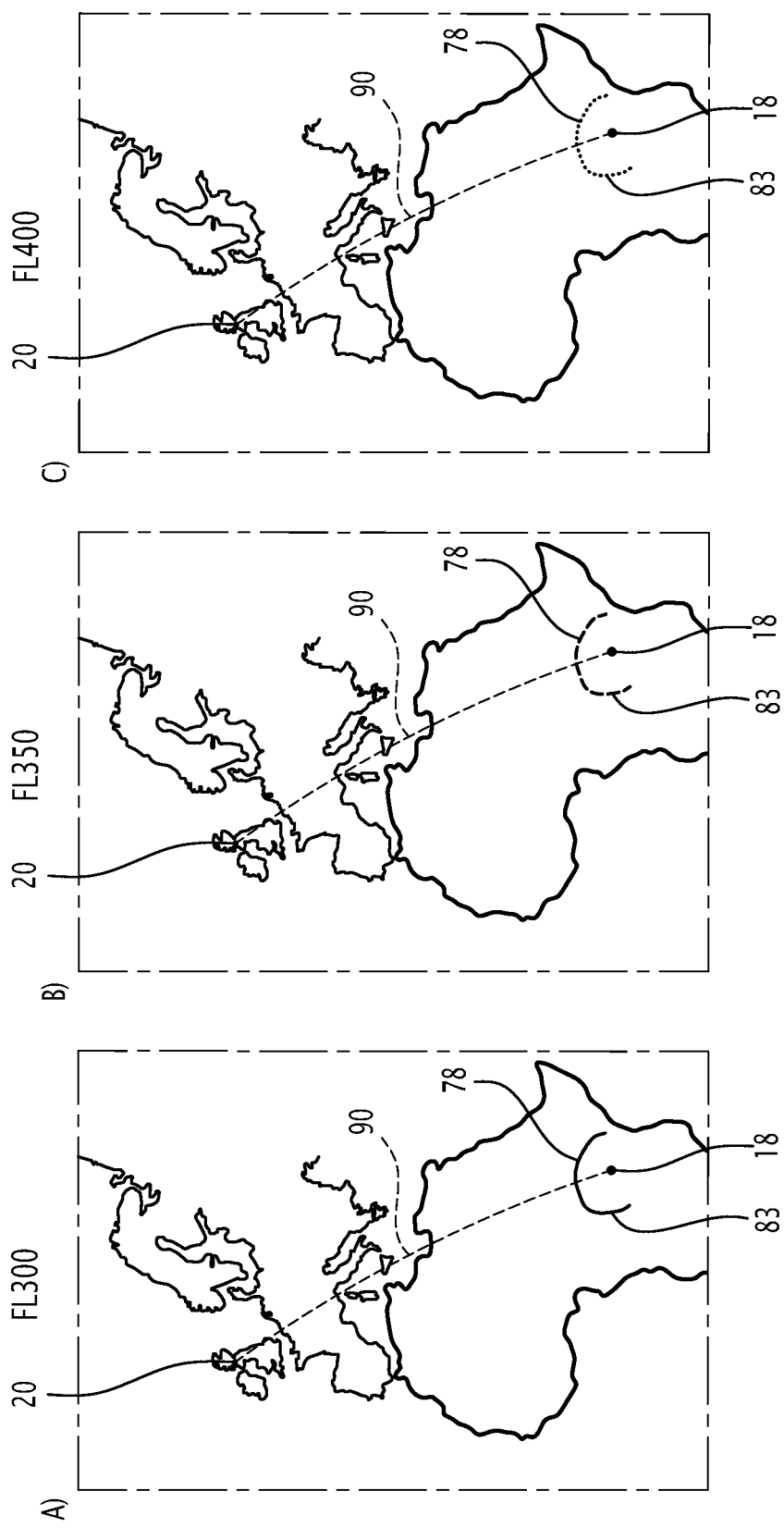
FIG. 6 is a view similar to FIG. 2, illustrating several extended isochronous curves obtained at several flight levels, for the same displacement range.

As illustrated by FIG. 5 and by FIG. 6, the extended iso-displacement curve 83 is obtained by superimposing the iso-displacement curves 79, 80, 81 obtained at the same displacement range, then by determining the location of the points on the iso-displacement curves 79, 80, 81 maximizing the distance traveled from the geographical starting point 18 or minimizing the distance to be traveled to the geographical point of arrival 20.

Thus, in a first direction, on the left in FIG. 5, the point 86A furthest from the selected point 78 is located on the iso-displacement curve 79 corresponding to an altitude level flight at the given flight level FL300. On the contrary, in the direction on the right in FIG. 5, the point 86B furthest from the selected point 78 is a point of the iso-displacement curve 81 corresponding to a displacement of the aircraft at an altitude level, at a flight level FL400 distinct from the given flight level FL300, and then in descent according to the predetermined profile toward the given flight level FL300.

The points 86A, 86B of the extended iso-displacement curve 83 thus formed are therefore advantageously located on several iso-displacement curves 79, 80, 81 in order to maximize the total distance traveled from the geographical point of origin 18 or to minimize the total distance to the geographical destination point 20.

The first calculating module 64 is capable of selectively excluding the points that are located in the forbidden flight zones or levels 24, in zones 28 with dangerous weather phenomena and/or in turbulent zones 30. The calculating module 24 is also able to exclude the points that are not located in a satellite coverage zone 32.

Figure 4:
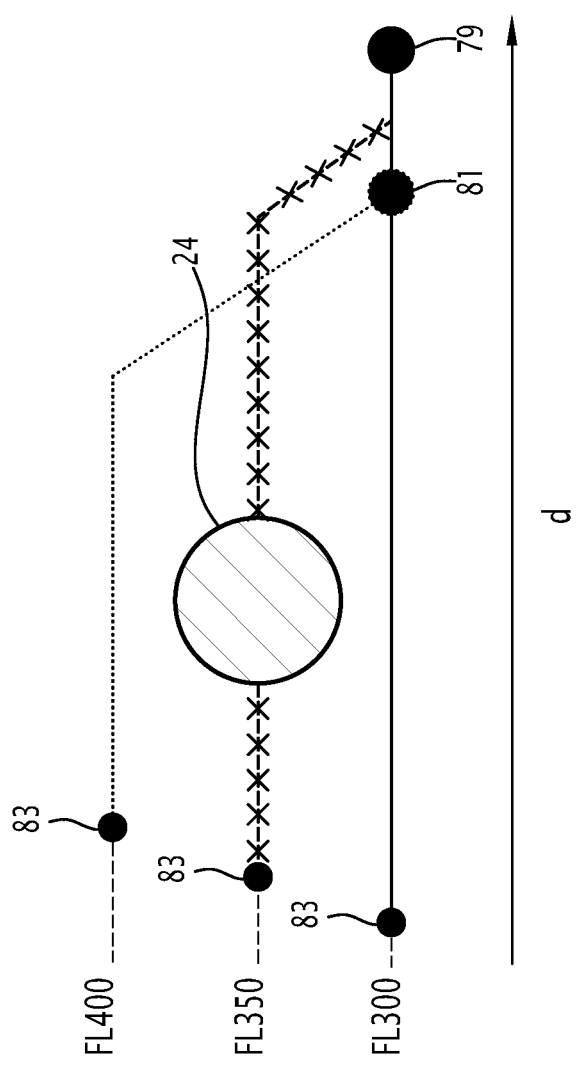
FIG. 4 is a view similar to FIG. 3, illustrating the section in a vertical plane of an avoidance zone.
Figure 13:
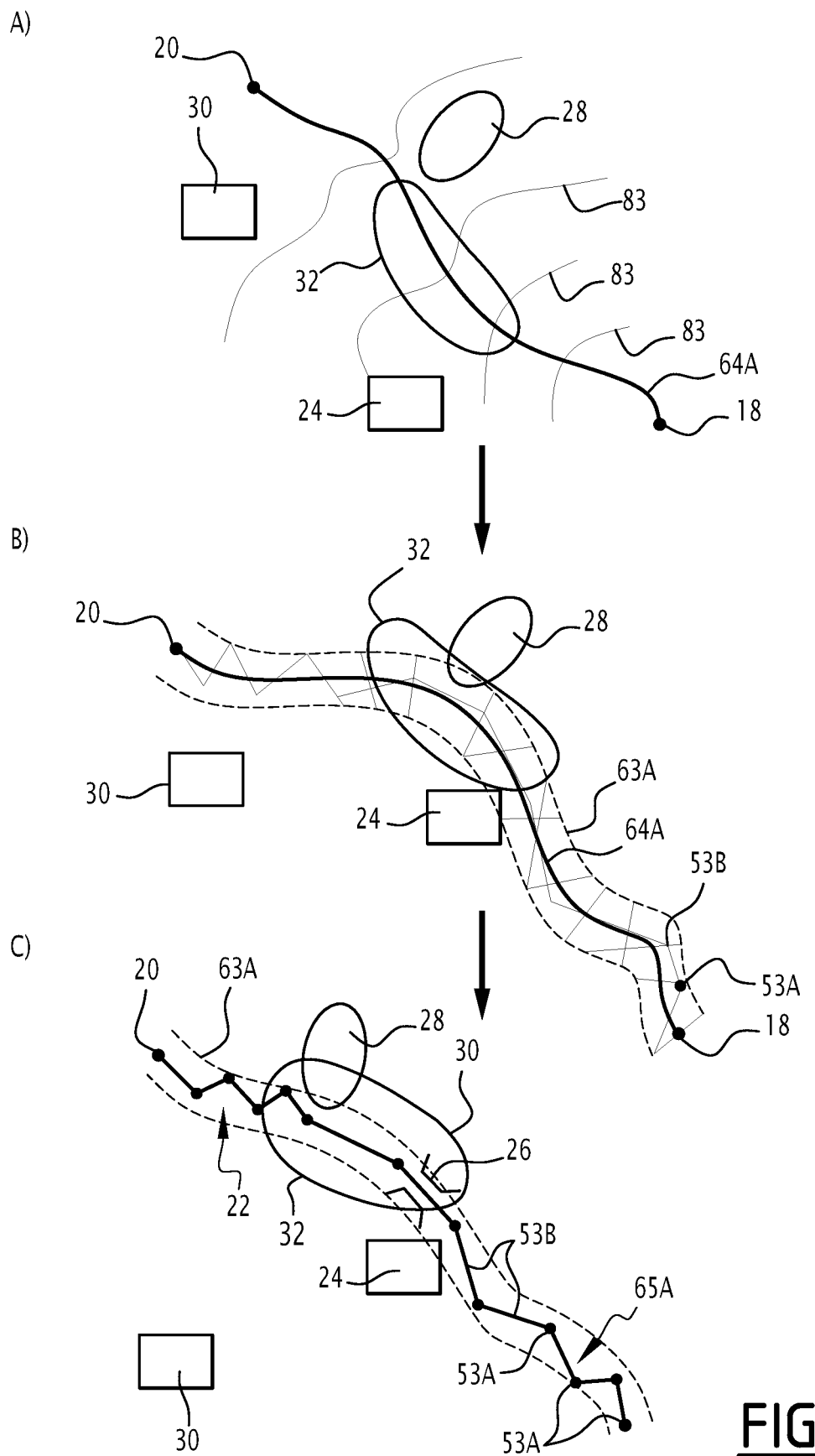
FIG. 13 illustrates a variant embodiment of the invention illustrating the principle of going from a free path to a path constrained by airways.

The avoidances done of defined four-dimensional zones are for example illustrated in FIG. 13 in cross-section in the horizontal plane, and in FIG. 4 in cross-section in the vertical plane.

Figure 10:
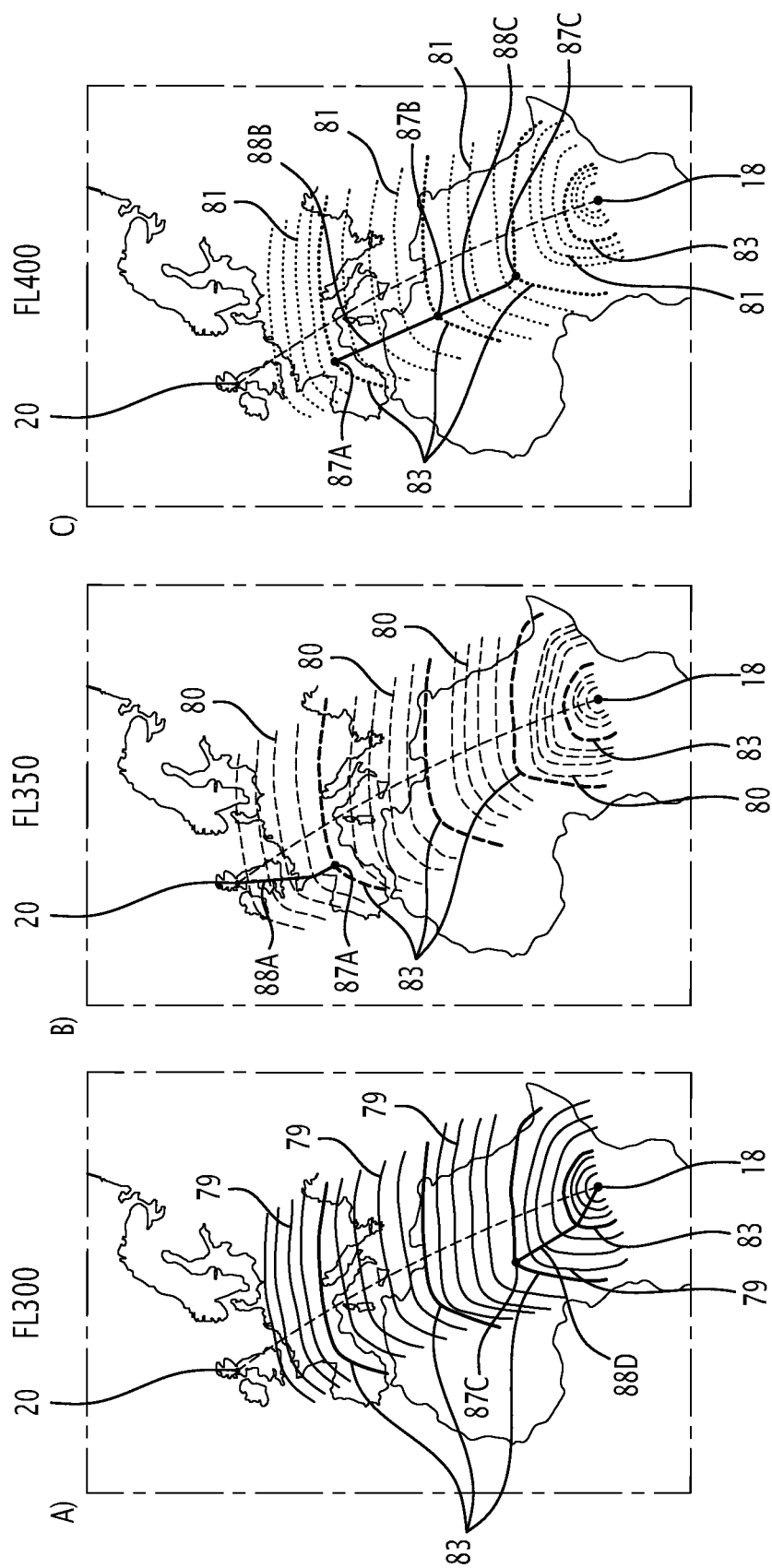
FIG. 10 is a view similar to FIG. 2, illustrating the obtainment of a path between a geographical starting point and a geographical destination point.

As shown in FIG. 10, the first calculating module 64 is able to determine a plurality of successive extended iso-displacement curves 83, obtained at successive time ranges, from iso-displacement curves 79, 80, 81 each corresponding to one or several time increments within each displacement range.

Advantageously, as shown in FIG. 10, the first calculating module 64 is able to determine the successive extended iso-displacement curves 83 at several flight levels FL300, FL350, FL400.

The first calculating module 64 is able to choose an optimal path 64A by basing itself on the calculated extended iso-displacement curves 83.

In reference to FIG. 13, the first calculating module 64 is able to determine each point of the optimal path 64A non-restricted or constrained by a network of waypoints 53A and/or imposed paths 53B between the waypoints 53A.

Thus, the determination of the optimal path 64A by the first path calculating module 64 is implemented as if the aircraft were able to perform a free flight taking account of mission specifications, but without taking into account a network of waypoints 53A and/or imposed paths 53B between the waypoints 53A that are defined by the air traffic control authorities.

In reference to FIG. 10, the optimal path 64A is preferably determined from the geographical destination point 20, or a beginning of descent point toward the point 20, by moving up the iso-displacement curves 80 at the final flight level FL350 having made it possible first to reach the geographical destination point 20 or the beginning of descent point, up to the point 87A of the extended iso-displacement curve 83 corresponding to the last displacement range made up of several iso-displacement increments. This defines a first path section 88A.

The point 87A of the extended iso-displacement curve 83 corresponds to a point of an iso-displacement curve 79, 80, 81 that results either from an altitude level flight at the same flight level as the final flight level FL350, or from an altitude level phase 84 at a flight level FL300, FL400 different from the final flight level FL350 and a phase 85 for reaching the final flight level.

In the second case, shown on the right in FIG. 10, the iso-displacement curves 81 at a distinct flight level FL400 are next escalated up to the point 87B of the extended iso-displacement curve 83 adjacent to the same flight level FL400 from which the point 87A had been obtained. This defines a second path section 88B.

In the first case, shown by the point 87B in FIG. 10, the iso-displacement curves 80 at the same flight level FL400 are escalated up to the point 87C of the extended iso-displacement curve 83 adjacent to the same flight level FL400 from which the point 87B had been obtained. This defines a third path section 88C. The point 87C here has been obtained from an altitude level phase 84 at the flight level FL300 followed by a climb phase 85 to the flight level FL400.

This mechanism is repeated until reaching the geographical point of origin 18, as illustrated on the left in FIG. 10.

The first calculating module 64 is thus able to define an optimal path 64A not only in the horizontal plane, but also in the vertical plane.

Figure 11:
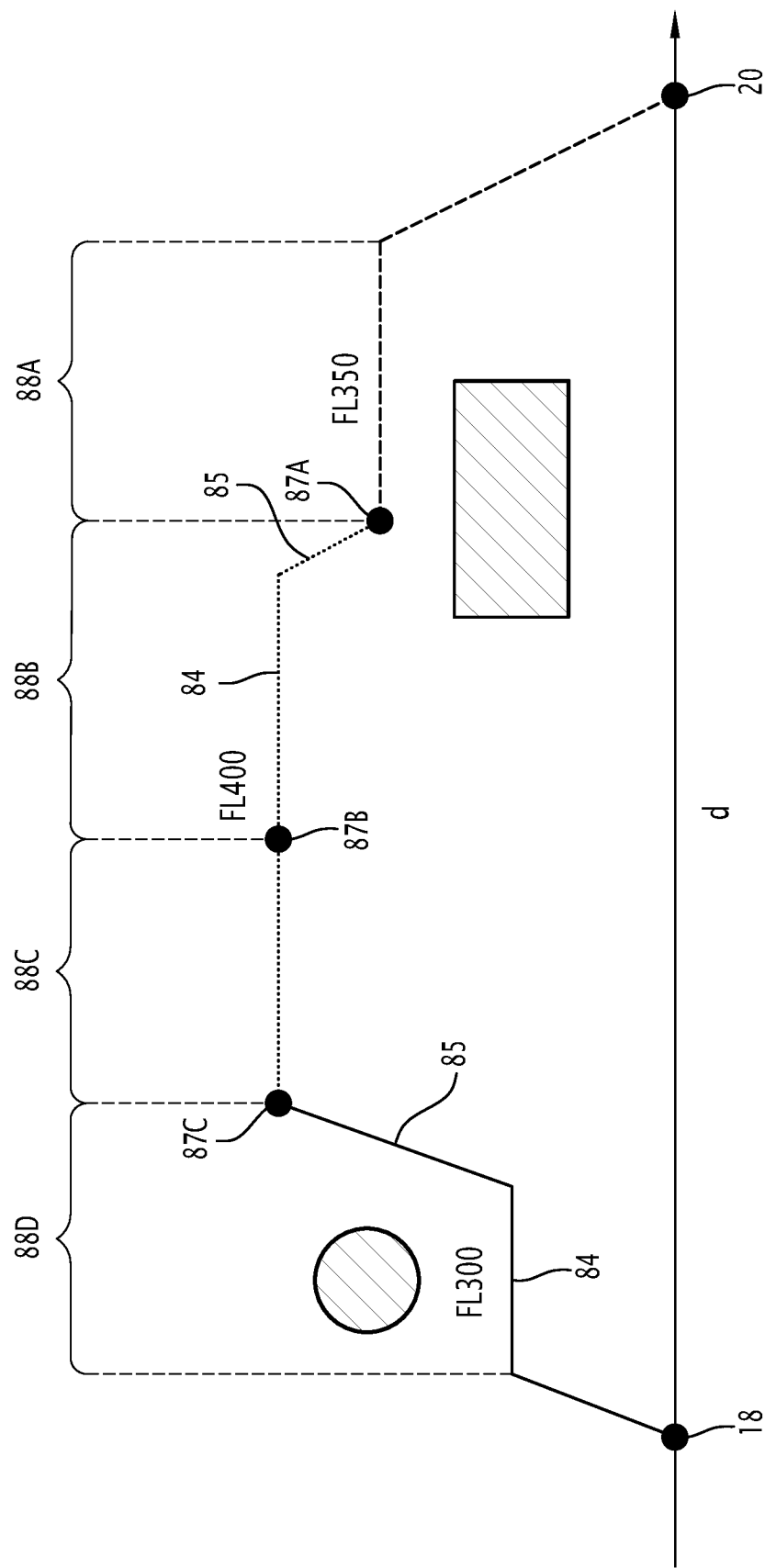
FIG. 11 illustrates a vertical profile of the path.

The path profile in the vertical plane is illustrated in FIG. 11 and comprises a plurality of path sections 88A to 88D. Each path section 88A, 88B, 88C is determined by and/or from an extended iso-displacement curve 83, and comprises either a single altitude level phase 84, or an altitude level phase 84, and a phase 85 for reaching another altitude level.

The path profile in the horizontal plane is illustrated in FIG. 12.

In this example, iso-displacement curves are advantageously isochronous curves. By definition, an isochronous curve is a curve connecting the points accessible to the aircraft from a given point (which can be the point of origin 18 or a point on an extended isochronous curve 83) in a given time, which corresponds to one or several time increments. Each time increment is for example between 1 minute and 1 hour, in particular between 2 minutes and 10 minutes, for example 5 minutes.

In this example, each isochronous curve is determined from a given point by computing, from the given point, all of the points accessible to the aircraft, at a given airspeed, taking account of the weather context, in particular the wind direction and intensity, as provided by the recovery module 60 and the airplane performance, as determined by the calculating functions of the application 68.

Advantageously, the calculating module 64 is able to calculate a series of isochronous curves 79, 80, 81 at several flight altitude levels, and extended isochronous curves 83 from isochronous curves 79, 80, 81 obtained for a same time interval.

In reference to FIG. 13, the definition module 63 is advantageously able to define the optimization region 63A of the path as a function of a predetermined lateral distance from each point of the optimal path 64A defined by the first calculating module 64 and as a function of the operational mission specifications, in particular the mission context, in particular navigation constraints, weather constraints, and passenger comfort constraints.

Advantageously, the definition module 63 is able to laterally delimit the optimization region 63A of the path 64A by lateral limits extending laterally at a distance chosen as a function of the density of the air network of each point of the optimal path 64A.

This chosen distance is generally less than 1852 km (1000 nautical miles (nm)) and can for example be between 185 km (100 nm) and 926 km (500 nm) in a low-density network, for example in Africa, and between 183 km (99 nm) and 55 km (30 nm) in a high-density network, like in Europe.

Thus, the optimization region 63A is generally defined by a band encompassing the path 64A. The band is potentially also restricted by forbidden flight zones 24, dangerous weather phenomena zones 28 and/or turbulence zones 30. Depending on the case, it encompasses satellite coverage zones 32.

The second module 65 for calculating paths 65A includes an application 92 for defining a network of nodes between the geographical point of origin 18 and the geographical destination point 20 from the network of waypoints 53A and/or imposed paths 53B between the waypoints 53A, and an application 93 for defining a cost associated with the passage from one node to an adjacent node from among the nodes of the network.

The second calculating module 65 also includes an application 98 for determining the optimized path 65A in the network of nodes based on a minimization of the total cumulative cost between the geographical point of origin 18 and the geographical destination point 20.

The definition application 92 is able to load the coordinates of waypoints 53A and imposed paths 53B between the waypoints 53A from the database 52, within the optimization region 63A.

The definition application 92 is able to define, among the waypoints 53A, the nodes that are the possible waypoints 53A for the aircraft in particular taking into account mission constraints, in particular navigation constraints, weather constraints, passenger comfort constraints, as defined above.

The definition application 93 is able to define the cost associated with the passage between two adjacent nodes based on the geographical distance separating the two nodes, and also the weather context recovered from the module 60, in particular the evolutive weather context and optionally the airplane context, for example the type and age of the engines, recovered from the initialization module 58.

The determination application 98 for the optimized path 65A is able to implement a cost minimization algorithm in order to define the least expensive path in the optimization region 63A passing through the nodes and through the imposed paths between the nodes, from the geographical point of origin 18 to the geographical destination point 20.

The algorithm is for example a Dijkstra algorithm and/or an A* algorithm. As input, the Dijkstra algorithm uses the weighted network defined above between the geographical point of origin 18 and the geographical destination point 20.

A description of the use of the Dijkstra algorithm is given in French patent application no. 18 00734.

A description of the A* algorithm is given in the article downloadable at the following address: https://en.wikipedia.org/wiki/A*_search_algorithm.

Once the optimized path 65A is obtained, the calculating engine 40 is advantageously able to determine at least one mission parameter of the aircraft corresponding to the optimized path 65A.

The mission parameter is for example a total weight of the aircraft on takeoff. This weight on takeoff is calculated on each iteration by the calculating module 64, then by the calculating module 65, based on the estimated consumption on the path between the point of origin 18 and the destination point 20, calculated using the functions for calculating the instantaneous fuel consumption and instantaneous airplane weight variation, and based on a passenger and freight load predefined in the operational specifications.

The calculating engine 40 is next able to perform calculating iterations successively using the modules 64, 65, by determining, in each iteration, a new optimal path 64A via the first calculating module 64 by calculating new extended iso-displacement curves 83, a new optimization region 63A using the determination module 63, then a new optimized path 65A using the second calculating module 65, until reaching a convergence on the value of the mission parameter.

Once the convergence is obtained, the mission engine 40 is able to verify the coherence of the high-speed performance levels using the application 66. The mission engine 40 is in particular able to verify that the weight at takeoff obtained using the calculating modules 64, 65 after convergence is less than or equal to the maximum weight allowing the aircraft to take off obtained using the low-speed application 70 to ensure that the aircraft will be able to take off on the terrain chosen for takeoff.

Once the final optimized path 65A is obtained, the second calculating module 65 provides a data file comprising a list of waypoints 53A, and a list of paths 53B between the waypoints 53A.

The data file provided by the second calculating module 65 further advantageously includes a list of headings TCA between the waypoints 53A, a list of distances DST between the waypoints 53A, a list of wind components COMP between the waypoints 53A, a list of true airspeeds TAS between the waypoints 53A, a list of ground speeds GS between the waypoints 53A, a list of static air temperatures SAT between the waypoints 53A, a list of turbulence levels SHR between the waypoints 53A, a list of estimated times of arrival ETA at a waypoint 53A, and a list of estimated en route times EET.

This data file can be recovered by the crew and/or loaded by manual entry or by data transfer in the flight management system 14, in order to be used during the flight.

A mission calculation method, implemented using the system 10 according to an embodiment the invention, will now be described.

This method is for example implemented during the preparation of the mission, to establish its feasibility, to prepare the mission more precisely, or to account for a last-minute change in a mission that has already been prepared.

Alternatively, this method is implemented during monitoring of the mission, or to test change hypotheses of the mission, to optimize it, or to reconfigure it.

Initially, the user, in particular the crew, enters at least a portion of the operational specifications using the configuration interface 42. The user for example defines, for each step of the mission, the geographical point of origin 18, the geographical destination point 20, and optionally, a number of passengers to be transported, a desired airspeed, an imposed departure time and/or arrival time, a maximum distance to be traveled.

Then, when he wishes to define a possible path, he activates the calculating engine 40. The initialization module 58 recovers the operational specifications in particular from the interface 42 in order to obtain all of the information on each step of the mission.

The initialization module 58 advantageously recovers other operational specifications from the management and monitoring system 16 of the aircraft.

This step initializes the operational specifications related to the mission context and the airplane context, for example the presence of failures or dispatches. This step also initializes the passenger comfort operational specifications, in particular in terms of connectivity and turbulence level. This step for specifying acceptable weather data is advantageously done at the user interface 42.

The initialization is advantageously done considering a purely orthodromic path in a standard atmosphere ("perfect" flight data).

Then, the weather context recovery module 60 queries the weather database 50 in particular to obtain the speeds and directions of the wind between the point of origin 18 and the destination point 20, at several flight levels.

The airplane performance determining module 62 is then activated. The application 66 for determining the weight and balance determines the weight of the aircraft and the center of gravity of the aircraft (Zero Fuel Weight and Zero Fuel Weight Center of Gravity), based on the empty weight of the aircraft, equipment on board the aircraft, passengers and/or freight on board, and their position in the aircraft.

On this basis, based on the weather context recovered by the recovery module 60, based on the airplane context recovered from the initialization module 58, and based on the desired airspeed, the high-speed performance determining application 68 determines an initial path 90 of the aircraft and the associated consumption of the aircraft using the position of the center of gravity determined by the application 66.

The application 68 then calculates the set of mission parameters, in particular the route, the time of arrival, the flight profile and the fuel consumption, which in particular makes it possible to deduce the weight at takeoff therefrom.

The first calculating module 64 then calculates, from at least one chosen point 78 accessible to the aircraft, a plurality of iso-displacement curves 79, 80, 81 each corresponding to a displacement of the aircraft at a distinct flight altitude level (for example FL300, FL350, FL400), after one or several displacement increments.

The first calculating module 64 next determines, based on iso-displacement curves 79, 80, 81 obtained at a same displacement range corresponding to several displacement increments at different flight altitude levels FL300, FL350, FL400, at least one extended iso-displacement curve 83, maximizing the movement done from the geographical point of origin 18 or minimizing the movement to be done toward the geographical destination point 20.

The first calculating module 64 then calculates at least one optimal path 64A between the point of origin 18 and the destination point 20 based on the extended iso-displacement curves 83.

The chosen accessible point 78 is initially the geographical point of origin 18, as illustrated by FIG. 2. In a variant, the chosen accessible point is an end of climb point from the geographical point of origin 18.

Once at least one extended iso-displacement curve 83 is obtained, each iso-displacement curve 79, 80, 81 is obtained from accessible points 78 located on the extended iso-displacement curve 83, as illustrated by FIG. 7.

In the example illustrated by the figures, from the geographical point of origin 18 or any point of an extended iso-displacement curve 83, the first calculating module 64 establishes at least one iso-displacement curve 79, 80, 81 over a preset time increment from the chosen point, taking account of the selected airspeed, the weather context, airplane performance determined by the functions for calculating instantaneous fuel consumption and instantaneous airplane weight variation and for determining reachable flight levels described above, and operational specifications defined by the initialization module 58.

The first calculating module 64 is capable of selectively excluding the points that are located in the forbidden flight zones or levels 24, in zones 28 with dangerous weather phenomena and/or in turbulent zones 30. The calculating module 24 is also able to exclude the points that are not located in a satellite coverage zone 32.

In reference to FIG. 3, the iso-displacement curves 79, 80, 81 are obtained for a given flight level, here FL300, for displacements of the aircraft at flight altitude levels at starting flight levels FL300, FL350, FL400 equal to or distinct from the given flight level FL300 from an accessible point here located on an iso-displacement curve 83 of the respective starting flight level FL300, FL350, FL400.

Thus, in FIG. 3, the iso-displacement curve 79 is obtained by causing the aircraft to move at a constant altitude level corresponding to the given flight level FL300, from an accessible point on the extended iso-displacement curve 83 at the starting flight level FL300 that corresponds to the given flight level FL300.

The iso-displacement curves 80 and 81 are obtained by performing an altitude level flight phase 84 at a starting flight level FL350, FL400 distinct from the given flight level FL300, starting from the iso-displacement curve 83 at the respective starting flight level FL350, FL400, then a phase for reaching the given flight level FL300.

The reaching phase 85 for example comprises a climb or a descent according to the predetermined profile in order to reach the given flight level FL300 from the altitude level flight done at a flight level FL350, FL400 distinct from the given flight level FL300.

Advantageously, for a given displacement range corresponding to several displacement increments, the calculating module 64 determines an intermediate increment from which the reaching phase 85 begins, by for example determining the time necessary to reach the given flight level FL300 from the respective starting flight level FL350, FL400. This intermediate increment is determined as a function of the predetermined flight profile in the phase 85, taking account of the selected airspeed, the weather context, the airplane performance levels determined by calculating functions of the applications 66 and 68, and operational specifications defined by the initialization module 58.

The calculating module 64 next determines an intermediate iso-displacement curve, at the intermediate increment, for an altitude level flight at the starting flight level FL350, FL400, then defines the iso-displacement curve 80, 81 at the given flight level FL300 derived from the reaching phase 85, at the displacement range, from the intermediate iso-displacement curve previously defined.

As illustrated by FIG. 5 and FIG. 6, the extended iso-displacement curve 83 is obtained by superimposing the iso-displacement curves 79, 80, 81 obtained at the same displacement range, then by determining the location of the points on the iso-displacement curves 79, 80, 81 maximizing the distance traveled from the geographical starting point 18.

The points 86A, 86B of the extended iso-displacement curve 83 thus formed are therefore advantageously located on several iso-displacement curves 79, 80, 81 in order to maximize the distance traveled from the geographical point of origin 18 or minimize the distance to be traveled to the geographical destination point 20.

As shown in FIG. 10, the first calculating module 64 determines a plurality of successive extended iso-displacement curves 83, obtained at successive time ranges, from iso-displacement curves 79, 80, 81 each corresponding to one or several time increments within each displacement range.

Advantageously, as shown in FIG. 10, the first calculating module 64 determines the successive extended iso-displacement curves 83 at several flight levels FL300, FL350, FL400.

The first calculating module 64 next defines an optimal path 64A by basing itself on the determined extended iso-displacement curves 83 and a total mass on takeoff of the aircraft corresponding to this optimal path 64A.

The first calculating module 64 determines each point of the optimal path 64A non-restrictively by a network of waypoints 53A and/or imposed paths 53B between the waypoints 53A.

In reference to FIG. 10, the optimal path 64A is preferably determined from the geographical destination point 20, or a beginning of descent point toward the point 20, by moving up the iso-displacement curves 80 at the final flight level FL350 having made it possible first to reach the geographical destination point 20 or the beginning of descent point, up to the point 87A of the extended iso-displacement curve 83 corresponding to the last displacement range made up of several iso-displacement increments. This defines a first path section 88A.

The point 87A of the extended iso-displacement curve 83 corresponds to a point of an iso-displacement curve 79, 80, 81 that results either from an altitude level flight at the same flight level as the final flight level FL350, or from an altitude level phase 84 at a flight level FL300, FL400 different from the final flight level FL350 and a phase 85 for reaching the final flight level.

In the second case, shown on the right in FIG. 10, the iso-displacement curves 81 at a different flight level FL400 are next escalated up to the point 87B of the extended iso-displacement curve 83 adjacent to the same flight level FL400 having made it possible to reach the point 87A. This defines a second path section 88B.

In the first case, shown by the point 87B in FIG. 10, the iso-displacement curves 80 at the same flight level FL400 are escalated up to the point 87C of the extended iso-displacement curve 83 adjacent to the same flight level FL400 having made it possible to reach the point 87B. This defines a third path section 88C.

This is repeated until reaching the geographical point of origin 18, as illustrated on the left in FIG. 10.

The optimal path 64A and the corresponding mass of the aircraft on takeoff are obtained simply, while greatly limiting the number of calculations and tests to be performed, owing to the use of the extended iso-displacement curves 83.

These curves 83 indeed avoid having to determine multiple combinations of flight altitude levels, by directly integrating the points having led to the maximum distance traveled independently of the flight profile. Furthermore, the intermediate determination of the iso-displacement curves 79, 80, 81 accounts for zones to be avoided, or on the contrary, to be favored both in the horizontal plane and the vertical plane.

Thus, the route and performance calculation is more integrated, leading to fewer iterations. Furthermore, the taking into account of phases 85 for reaching of a altitude level by the first calculating module 84 makes the calculation more efficient and closer to reality.

In this example, iso-displacement curves 79, 80, 81 are isochronous curves as defined above. Each time increment is for example between 1 minute and 1 hour, in particular between 2 minutes and 10 minutes, for example 5 minutes. Each time range between two extended iso-displacement curves 83 is then advantageously defined by at least 3 time increments, in particular by between 4 and 20 time increments.

As specified above, the optimal path 64A is obtained upon each iteration non-restrictively by the network of waypoints 53A and/or imposed paths 53B between the waypoints 53A.

Then upon each iteration, as illustrated in FIG. 13, the definition module 63 advantageously defines the optimization region 63A of the path around the optimal path 64A as a function of a predetermined lateral distance from each point of the optimal path 64A defined by the first calculating module 64 and as a function of the operational mission specifications, in particular the mission context, in particular navigation constraints, weather constraints, and passenger comfort constraints.

Advantageously, the definition module 63 laterally delimits the optimization region 63A of the path 64A by lateral limits extending laterally at a distance chosen as a function of the density of the air network of each point of the optimal path 64A.

Thus, the optimization region 63A is generally defined by a band encompassing the path 64A. As previously indicated, the band is also potentially restricted by the forbidden flight zones 24, dangerous weather phenomena zones 28 and/or turbulence zones 30. Depending on the case, it encompasses the satellite coverage zones 32.

Next, as illustrated by FIG. 10, the definition application 92 loads the coordinates of waypoints 53A and imposed paths 53B between the waypoints 53A from the database 52, within the optimization region 63A.

The definition application 92 defines, among the waypoints 53A, the nodes 96 that are the possible waypoints 53A for the aircraft in particular taking into account mission constraints, in particular navigation constraints, weather constraints, passenger comfort constraints.

The definition application 93 further defines the cost associated with the passage between two adjacent nodes 96 based on the geographical distance separating the two nodes 96, and also the weather context recovered from the module 60, and optionally the airplane context, for example the type and age of the engines, recovered from the initialization module 58.

The determination application 98 for the optimized path 65A next implements a cost minimization algorithm in order to define the least expensive path passing through the nodes 96 and through the imposed paths between the nodes 96, from the geographical point of origin 18 to the geographical destination point 20. This algorithm is for example a Dijkstra algorithm. An optimized path 65A is then obtained by minimizing the cost, as described in patent application no. 18 00734.

The optimized path 65A obtained upon each iteration is restricted by a network of waypoints 53A and imposed paths 53B between the waypoints 53A in the air network.

The calculation engine 40 then calculates the set of mission parameters based on the optimized path 65A obtained in the current iteration, and determines the difference between the mission parameter to be optimized (for example, the weight at takeoff) for the initial path and the mission parameter to be optimized for the optimized path 65A.

The calculation engine then performs new path calculations 64A, 65A, as previously described, by using the iso-displacement curves, until the mission parameter, here the weight at takeoff, converges toward a desired mission parameter value.

The convergence is for example determined when the difference between the value of the mission parameter for the path determined in the previous iteration and that determined in the current iteration is below a predetermined value.

In particular, in the case of the weight on takeoff, the difference between the weight at takeoff for the path determined in the previous iteration and that determined in the current iteration must be below a predetermined weight, for example equal to 100 pounds.

In a variant, the mission parameter is the weight on landing or the distance traveled along the path.

Advantageously, after convergence, the mission engine 40 verifies the coherence of the high-speed performance levels using the application 66.

The mission engine 40 in particular verifies that the weight on takeoff obtained using the calculating modules 64, 65 after convergence is less than or equal to the maximum weight allowing the aircraft to take off obtained using the low-speed application 70 to ensure that the aircraft will be able to take off on the terrain chosen for takeoff.

More generally, the low-speed performance determining software application 70 is implemented to verify that the obtained mission parameters are compatible with the terrain on which the aircraft is intended to take off and/or land.

The calculating engine 40 then establishes a data file comprising a list of waypoints 53A, and a list of paths 53B between the waypoints 53A.

As indicated above, the data file provided by the second calculating module 65 further advantageously includes a list of headings TCA between the waypoints 53A, a list of distances DST between the waypoints 53A, a list of wind components COMP between the waypoints 53A, a list of true air speeds TAS between the waypoints 53A, a list of ground speeds GS between the waypoints 53A, a list of static air temperatures SAT between the waypoints 53A, a list of turbulence levels SHR between the waypoints 53A, a list of estimated times of arrival ETA at a waypoint 53A, and a list of estimated en route times EET.

Figure 14:
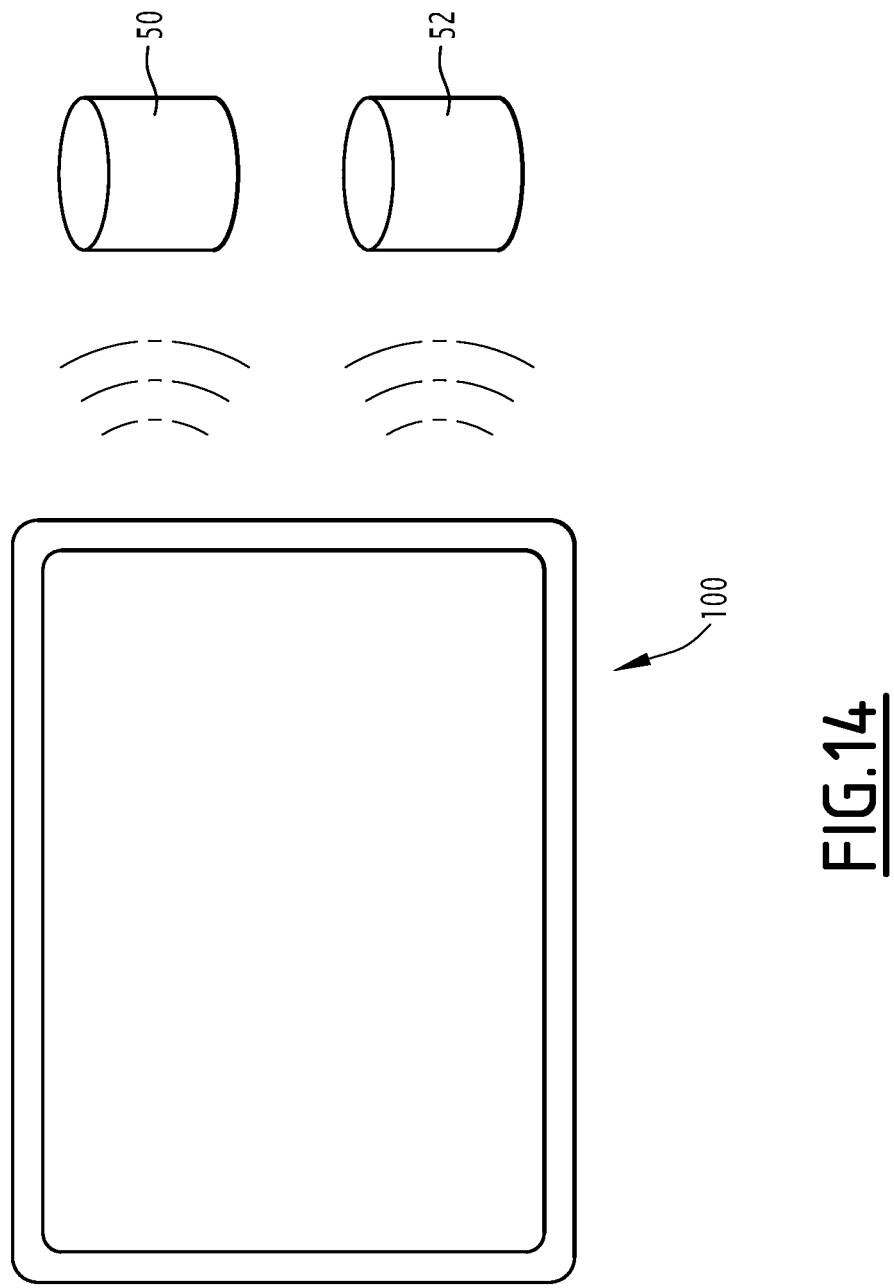
FIG. 14 is a schematic view of a mission calculating system according to a further embodiment of the invention.

In the variant illustrated in FIG. 14, the calculating system 10 is integrated within an electronic flight bag (EFB) or a portable electronic device 100.

The portable electronic device 100 is for example connected to the databases 50, 52 by a wireless datalink according to a wireless transmission protocol for example of the Wi-Fi type (for example according to Standard IEEE 802.11) or the Bluetooth type (for example according to Standard IEEE 802.15-1-2005).

In another variant, each iso-displacement curve calculated by the calculating module 64 is a fuel iso-consumption curve.

The first calculating module 64 is able, from any selected point 78 accessible to the aircraft, to establish a plurality of fuel iso-consumption curves, corresponding to altitude levels at different flight levels, over a predetermined consumed fuel increment from the selected point 78, then to determine an extended fuel iso-consumption curve from the plurality of fuel iso-consumption curves.

By definition, a fuel iso-consumption curve is a curve connecting the points accessible to the aircraft from a given point 82 with a given fuel consumption, which corresponds to one or several consumed fuel increments. Each consumed time increment is chosen at a constant value for example of between 22.7 kg (50 pounds) and 453.6 kg (1000 pounds), in particular between 36.3 kg (80 pounds) and 54.4 kg (120 pounds).

In this example, each fuel iso-consumption curve is determined from a selected point 78 by calculating, from the selected point, all of the points accessible to the aircraft, at a given airspeed, taking account of the weather context, in particular the wind direction and intensity, as provided by the recovery module 60 and the airplane performance, as determined by the determining module 62.

Like before, the first calculating module 64 is capable of selectively excluding the points that are located in the forbidden flight zones or levels 24, in zones 28 with dangerous weather phenomena and/or in turbulent zones 30. On the contrary, the first calculating module 64 is also able to exclude the points that are not located in a satellite coverage zone 32.

The first calculating module 64 is next able to define an optimal path 64A by choosing, on successive extended fuel iso-consumption curves, successive points of the optimal path 64A.

In another variant, the iso-displacement curves are iso-cost curves, the cost being defined as a function of the travel time and the consumed fuel, for example in a travel time and consumed fuel ratio.

Each displacement increment is a cost increment with a given constant value.

Each iso-cost curve is determined from a selected point 78 by computing, from the selected point, all of the points accessible to the aircraft, at a given airspeed, taking account of the weather context, in particular the wind direction and intensity, as provided by the recovery module 60 and the airplane performance, as determined by the calculating functions of the application 68.

Like before, the first calculating module 64 is capable of selectively excluding the points that are located in the forbidden flight zones or levels 24, in zones 28 with dangerous weather phenomena and/or in turbulent zones 30. On the contrary, the first calculating module 64 is also able to exclude the points that are not located in a satellite coverage zone 32.

The first calculating module 64 is next able to define an optimal path 64A by choosing, on successive extended iso-cost curves, successive points of the optimal path 64A.

In still another variant of all of the embodiments previously described, the iso-displacement curves are not determined at a given airspeed, but according to a determined airspeed profile, for example as a function of the altitude or at maximum thrust.

What is claimed is:

1. An aircraft mission calculating system comprising a calculating engine configured to calculate mission aircraft paths, the calculating engine comprising:
   a first path calculator configured to calculate an optimal mission path between a geographical point of origin and a geographical destination point, as a function of airplane performance, operational mission specifications and a weather context in a mission space between the geographical point of origin and the geographical destination point,
   the first path calculator being configured to calculate a plurality of iso-displacement curves from at least one selected point accessible to the aircraft, at a displacement range corresponding to several successive displacement increments of the aircraft from the selected point, the iso-displacement curves being obtained at the displacement range for a displacement of the aircraft, up to a given flight level from displacements of the aircraft at distinct flight altitude levels,
   the first path calculator being configured to determine, based on iso-displacement curves up to the given flight level, obtained at distinct flight altitude levels, taken at the same displacement range of the aircraft:
      at least one extended iso-displacement curve at the given flight level, the at least one extended iso-displacement curve at the given flight level maximizing the displacement of the aircraft from the geographical point of origin or minimizing the displacement of the aircraft toward the geographical destination point,
   the aircraft mission calculating system being configured to generate a data file including the mission path calculated from the calculating engine from the at least one extended iso-displacement curve for input into a flight management system to guide the aircraft based on the mission path.

2. The aircraft mission calculating system according to claim 1, wherein the first path calculator is configured to calculate at least a first iso-displacement curve of the plurality of iso-displacement curves up to the given flight level corresponding to an altitude level displacement at the given flight level, the first path calculator being configured to calculate at least one second iso-displacement curve of the plurality of iso-displacement curves up to the given flight level corresponding to a displacement of the aircraft at an altitude level different from the given flight level, the at least one second iso-displacement curve being obtained with a displacement of the aircraft including an altitude level flight phase at the altitude level different from the given flight level and a phase for reaching the given flight level from the altitude level flight phase.

3. The aircraft mission calculating system according to claim 2, wherein the phase for reaching the given flight level comprises an ascent or a descent according to a predetermined profile.

4. The aircraft mission calculating system according to claim 3, wherein the predetermined profile comprises a constant gradient, constant Mach or constant true airspeed.

5. The aircraft mission calculating system according to claim 2, wherein calculating the at least one second iso-displacement curve comprises calculating an intermediate displacement increment at which the phase for reaching the given flight level begins, determining an intermediate iso-displacement curve at the distinct flight altitude level, at the intermediate displacement increment, then determining the iso-displacement curve up to the given flight level from the intermediate iso-displacement curve.

6. The aircraft mission calculating system according to claim 1, wherein the extended iso-displacement curve is determined as a location of points of the plurality of iso-displacement curves up to the given flight level, for which the displacement of the aircraft from the geographical point of origin is maximized or for which the displacement of the aircraft toward the geographical destination point is minimized, each point of the extended iso-displacement curve being a point of a specific iso-displacement curve up to the given flight level chosen among the plurality of iso-displacement curves obtained for a displacement of the aircraft up to the given flight level from displacements of the aircraft at different flight altitude levels.

7. The aircraft mission calculating system according to claim 1, wherein the selected point is the geographical point of origin or the end point of climb from the geographical point of origin or wherein the selected point is the geographical destination point for a start point of descent toward the geographical destination point.

8. The aircraft mission calculating system according to claim 1, wherein the selected point is a point on a previously determined extended iso-displacement curve.

9. The aircraft mission calculating system according to claim 1, wherein the first path calculator is configured to determine a plurality of successive iso-displacement curves at each displacement increment, at least an extended iso-displacement curve of the at least one extended iso-displacement curve being obtained from another extended iso-displacement curve by the first path calculator calculating a plurality of iso-displacement curves from the other extended iso-displacement curve, for a displacement range corresponding to several displacement increments of the aircraft, each iso-displacement curve being obtained for a displacement of the aircraft at a distinct flight altitude level toward a given flight level.

10. The aircraft mission calculating system according to claim 1, wherein the first path calculator is configured to define the optimal mission path from a plurality of path segments, each path segment being defined at a given flight level on a plurality of iso-displacement curves at the flight altitude level corresponding to the given flight level, from an extended iso-displacement curve and/or toward an extended iso-displacement curve.

11. The system according to claim 10, wherein the first path calculator is configured to determine, after each displacement range corresponding to several displacement increments, a plurality of extended iso-displacement curves at distinct flight levels, at least one path segment being defined between a first point of a first extended iso-displacement curve determined at a first flight level and a second point of a second extended iso-displacement curve determined at a second flight level different from the first flight level, the first point corresponding to a point of an iso-displacement curve resulting from an altitude level flight phase at the second flight level and a phase for reaching the first flight level from the altitude level flight phase at the second flight level.

12. The system according to claim 10, wherein the first path calculator is configured first to determine a downstream path segment before the geographical destination point or a beginning of descent point toward the geographical destination point and the extended iso-displacement curve corresponding to the last displacement range made up of several iso-displacement increments toward the geographical destination point or toward the geographical beginning of descent point toward the geographical destination point, the first path calculator next being configured to determine at least one upstream path segment between an extended iso-displacement curve corresponding to a displacement range made up of several iso-displacement increments from the geographical point of origin or from an end of climb point from the geographical point of origin.

13. The system according to claim 12, wherein the first path calculator is configured to determine at least one intermediate path segment between at least two extended iso-displacement curves on either side of a displacement range made up of several iso-displacement increments.

14. The system according to claim 1, wherein the mission context includes navigation constraints comprising at least one three-dimensional or four dimensional avoidance zone or three-dimensional or four-dimensional desired passage zone, the extended iso-displacement curve being calculated from chosen iso-displacement curves for displacements at flight altitude levels avoiding the three-dimensional or four-dimensional avoidance zone and/or passing through the three-dimensional or four-dimensional desired passage zone.

15. The system according to claim 1, wherein each iso-displacement curve is an isochronous curve, the first path calculator being configured to calculate a path minimizing the time between the geographical point of origin and the geographical destination point, or wherein each iso-displacement curve is a fuel iso-consumption curve, the first path calculator being configured to calculate a path minimizing the consumption of fuel between the geographical point of origin and the geographical destination point, or wherein each iso-displacement curve is an iso-cost curve, the cost being defined as a function of the travel time and the consumed fuel, the first path calculator being configured to calculate a path minimizing the cost between the geographical point of origin and the geographical destination point.

16. The system according to claim 1, wherein the first path calculator is configured to calculate an optimal mission path in a manner unconstrained by a network of waypoints and/or paths imposed between the waypoints, the calculating engine being configured to define, around the optimal mission path, an optimization region of the path and comprising a second path calculator, configured to calculate an optimized path in the optimization region in a manner constrained by a network of waypoints and/or paths imposed between the waypoints, taking the weather context into account.

17. The system according to claim 1, wherein the at least one operational specification includes an airplane context, and/or includes a mission context.

18. The system according to claim 1, wherein the weather context is evolutive.

19. The system according to claim 1, wherein the first path calculator is configured to calculate the at least one optimal mission path between the point of origin and the destination point based on the at least one extended iso-displacement curve.

20. A method for calculating a mission of an aircraft, using a mission calculating system including an engine configured to calculate paths of the aircraft during the mission, the method including:

calculating, via a first path calculator of the calculating engine, an optimal mission path between a geographical point of origin and a geographical destination point, as a function of airplane performance, operational mission specifications and a weather context, in a mission space between the geographical point of origin and the geographical destination point, comprising during the calculating via the first path calculator:

calculating a plurality of iso-displacement curves from at least one selected point accessible to the aircraft, at a displacement range corresponding to several successive displacement increments of the aircraft from the selected point, the iso-displacement curves being obtained at the displacement range for a displacement of the aircraft to a given flight level from displacements of the aircraft at distinct flight altitude levels, and determining, based on iso-displacement curves up to the given flight level, obtained at distinct flight altitude levels, taken at the same displacement range of the aircraft, at least one extended iso-displacement curve at the given flight level, the at least one extended iso-displacement curve at the given flight level maximizing the displacement of the aircraft from the geographical point of origin or minimizing the displacement of the aircraft toward the geographical destination point; and generating a data file including the mission path calculated from the calculating engine from the at least one extended iso-displacement curve for input into a flight management system to guide the aircraft based on the mission path.

* * * * *